US011030980B2

(12) United States Patent
Norieda et al.

(10) Patent No.: US 11,030,980 B2
(45) Date of Patent: Jun. 8, 2021

(54) INFORMATION PROCESSING APPARATUS, INFORMATION PROCESSING SYSTEM, CONTROL METHOD, AND PROGRAM

(71) Applicant: NEC Corporation, Tokyo (JP)

(72) Inventors: Shin Norieda, Tokyo (JP); Yoshinori Saida, Tokyo (JP); Satoshi Nishida, Tokyo (JP); Jun Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/493,377

(22) PCT Filed: Mar. 14, 2017

(86) PCT No.: PCT/JP2017/010204
§ 371 (c)(1),
(2) Date: Sep. 12, 2019

(87) PCT Pub. No.: WO2018/167843
PCT Pub. Date: Sep. 20, 2018

(65) Prior Publication Data

US 2020/0074962 A1 Mar. 5, 2020

(51) Int. Cl.
*G09G 5/38* (2006.01)
*G06T 7/70* (2017.01)
*G06F 3/01* (2006.01)

(52) U.S. Cl.
CPC ............... *G09G 5/38* (2013.01); *G06F 3/011* (2013.01); *G06T 7/70* (2017.01); (Continued)

(58) Field of Classification Search
CPC ............. G09G 5/38; G09G 2340/0464; G09G 2354/00; G06T 7/70; G06T 2207/30204; (Continued)

(56) References Cited

U.S. PATENT DOCUMENTS

2013/0201217 A1* 8/2013 Morinaga ............ G06K 9/3216
345/633
2013/0246136 A1 9/2013 Ramsey et al.
(Continued)

FOREIGN PATENT DOCUMENTS

JP 2013-190941 A 9/2013
JP 2015-011360 A 1/2015
(Continued)

OTHER PUBLICATIONS

International Search Report for PCT Application No. PCT/JP2017/010204, dated May 30, 2017.

*Primary Examiner* — Tapas Mazumder

(57) ABSTRACT

An information processing apparatus (2000) includes a first determination unit (2020), a second determination unit (2040), and a display control unit (2060). The first determination unit (2020) detects a first marker (10) from a captured image (30), and determines content corresponding to the detected first marker (10). The second determination unit (2040) detects a second marker (20) from the captured image (30), and determines a display position of a content image (40) in a display screen on the basis of the detected second marker (20). The display control unit (2060) displays the content image (40) at the determined display position in the display screen.

19 Claims, 31 Drawing Sheets

DISPLAY CONTENT IMAGE 40 CORRESPONDING TO CONTENT DETERMINED BASED ON FIRST MARKER AT DISPLAY POSITION IN DISPLAY SCREEN 50 DETERMINED BASED ON SECOND MARKER

(52) U.S. Cl.
CPC .............. *G06T 2207/30204* (2013.01); *G09G 2340/0464* (2013.01); *G09G 2354/00* (2013.01)

(58) Field of Classification Search
CPC ........ G06F 3/011; G06F 3/0426; G06F 3/014; G02B 27/017
See application file for complete search history.

(56) References Cited

U.S. PATENT DOCUMENTS

| | | | | |
|---|---|---|---|---|
| 2015/0016777 | A1 | 1/2015 | Abovitz et al. | |
| 2015/0269760 | A1 | 9/2015 | Murakami et al. | |
| 2015/0302639 | A1* | 10/2015 | Malekian | H04L 67/42 345/420 |
| 2016/0055676 | A1 | 2/2016 | Kasahara et al. | |
| 2016/0171773 | A1 | 6/2016 | Nara | |
| 2020/0160082 | A1* | 5/2020 | Kang | G06K 9/18 |

FOREIGN PATENT DOCUMENTS

| | | | |
|---|---|---|---|
| JP | 2015-504616 | A | 2/2015 |
| JP | 2015-522856 | A | 8/2015 |
| JP | 2015-176516 | A | 10/2015 |
| JP | 2016-110565 | A | 6/2016 |
| WO | 2014/162825 | A1 | 10/2014 |

* cited by examiner

DISPLAY CONTENT IMAGE 40 CORRESPONDING TO CONTENT DETERMINED BASED ON FIRST MARKER AT DISPLAY POSITION IN DISPLAY SCREEN 50 DETERMINED BASED ON SECOND MARKER

200

202 204

| CONTENT IDENTIFIER | FIRST MARKER |
|---|---|
| c001 |  |
| c002 |  |
| c003 |  |

INFORMATION PROCESSING APPARATUS, INFORMATION PROCESSING SYSTEM, CONTROL METHOD, AND PROGRAM

This application is a National Stage Entry of PCT/JP2017/010204 filed on Mar. 14, 2017, the contents of all of which are incorporated herein by reference, in their entirety.

TECHNICAL FIELD

The present invention relates to a user interface.

BACKGROUND ART

Various user interfaces have been developed. For example, an interface has been developed in which an image displayed by a computer appears to be present in a real space to a user by using a head mounted display or the like.

For example, Patent Document 1 discloses a technique of displaying a virtual keyboard on a head mounted display. Patent Document 2 discloses a technique of virtually attaching an annotation to an object on a real space viewed through a head mounted display by using a tablet terminal cooperating with the head mounted display. Patent Document 3 discloses a technique of displaying a menu screen on the palm or changing the menu screen according to a gesture (for example, a gesture of opening the palm) of the palm of a user.

RELATED DOCUMENT

Patent Document

[Patent Document 1] PCT Japanese Translation Patent Publication No. 2015-504616

[Patent Document 2] International Publication No. WO2014/162825

[Patent Document 3] US Patent Application Publication No. 2015/0016777

SUMMARY OF THE INVENTION

Technical Problem

The present inventor has examined development of a user interface with higher convenience. One of objects of the present invention is to provide a technique of increasing convenience of a user interface.

Solution to Problem

According to the present invention, there is provided an information processing apparatus including 1) a first determination unit that detects a first marker from a captured image, and determines content corresponding to the detected first marker; 2) a second determination unit that detects a second marker which is different from the first marker from a captured image, and determines a display position in a first display screen on the basis of the detected second marker; and 3) a display control unit that displays a content image regarding the determined content at the determined display position in the first display screen.

According to the present invention, there is provided an information processing system including the information processing apparatus; a first marker; a second marker; and a first display screen.

According to the present invention, there is provided a control method executed by a computer. The control method includes 1) a first determination step of detecting a first marker from a captured image, and determining content corresponding to the detected first marker; 2) a second determination step of detecting a second marker which is different from the first marker from a captured image, and determining a display position in a first display screen on the basis of the detected second marker; and 3) a display control step of displaying a content image regarding the determined content at the determined display position in the first display screen.

According to the present invention, there is provided a program causing a computer to execute each step of the control method of the present invention.

Advantageous Effects of Invention

According to the present invention, it is possible to provide a technique of increasing convenience of a user interface.

BRIEF DESCRIPTION OF THE DRAWINGS

The above-described object, and other objects, features, and advantages will become apparent throughout preferable example embodiments described below and the accompanying drawings.

DESCRIPTION OF EMBODIMENTS

Figure 1:
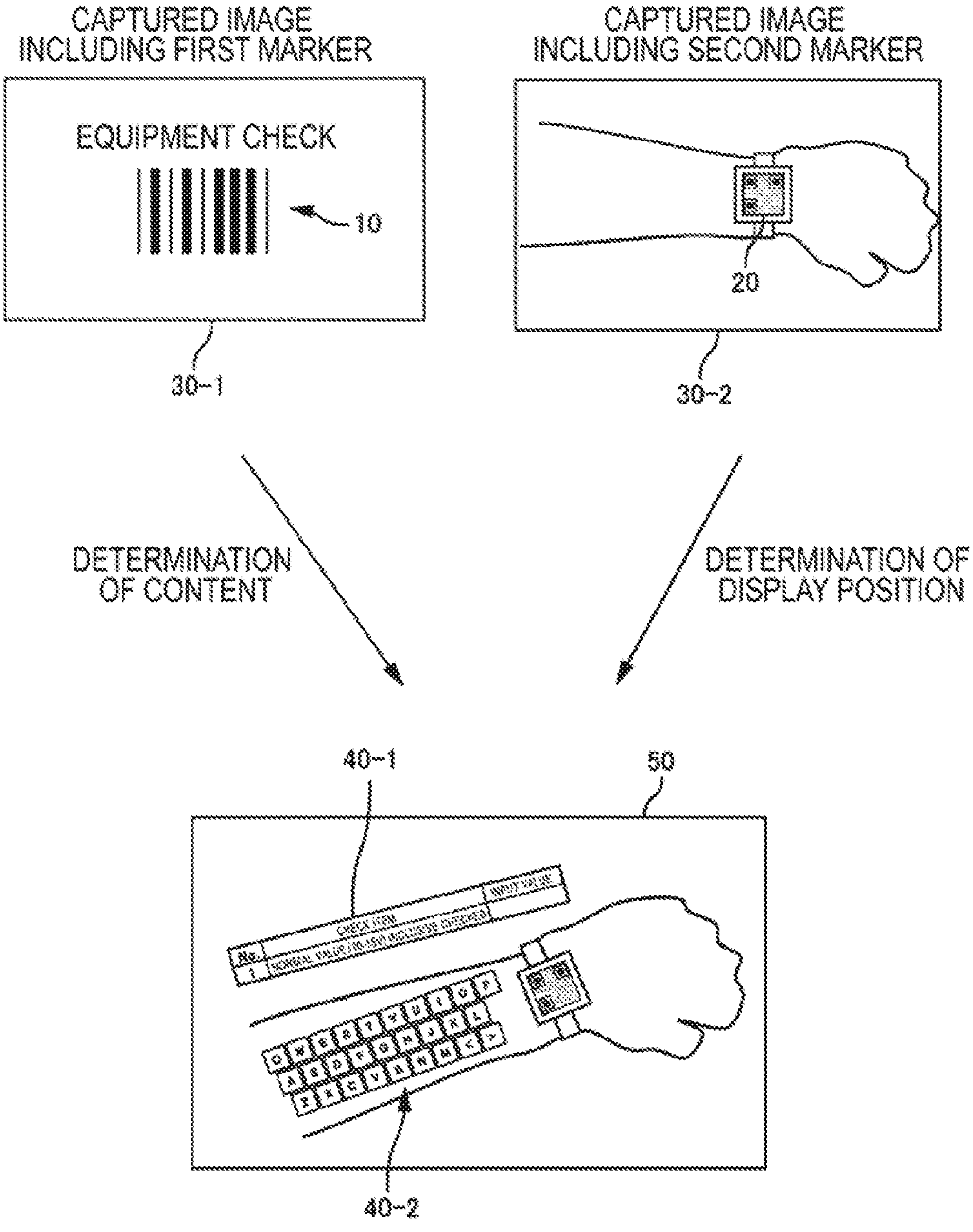
FIG. 1 is a diagram conceptually illustrating an operation of an information processing apparatus according to Example Embodiment 1.

Hereinafter, example embodiments of the present invention will be described with reference to the drawings. The same constituent elements are given the same reference numerals throughout all the drawings, and description thereof will not be repeated as appropriate. In each block diagram, unless particularly mentioned, each block indicates not a configuration in the hardware unit but a configuration in the functional unit.

Example Embodiment 1

<Outline>

FIG. 1 is a diagram conceptually illustrating an operation of an information processing apparatus 2000 according to Example Embodiment 1. The information processing apparatus 2000 detects a first marker 10 and a second marker 20 from a captured image 30. Note that the first marker 10 and the second marker 20 are different markers. The first marker 10 and the second marker 20 may be included in the same captured image 30, or may be included in different captured images 30. In FIG. 1, the first marker 10 and the second marker 20 are included in different captured images 30.

The information processing apparatus 2000 determines a content on the basis of the first marker 10 detected from the captured image 30. For example, in FIG. 1, an application such as "support for checking a facility" is determined as the content. Note that the content is not limited to an application as will be described later.

The information processing apparatus 2000 determines a display position of an image (hereinafter, a content image 40) corresponding to the content on the basis of the second marker 20. Here, the display position is a position in a display screen 50 of a display device.

The information processing apparatus 2000 displays the content image 40 corresponding to the content determined on the basis of the first marker 10 at the display position in the display screen 50 determined on the basis of the second marker 20.

As mentioned above, according to the information processing apparatus 2000 of the present example embodiment, the markers are used to determine not only a display position of an image regarding a content, but also the content. Thus, a user can use desired content by causing the information processing apparatus 2000 to detect a marker corresponding to the desired content. Therefore, the user can easily use the desired content, and can thus easily perform switching between contents. Therefore, according to the information processing apparatus 2000, a user interface with high convenience is provided to the user.

According to the information processing apparatus 2000, two different processes such as the determination of a content to be used by a user and the determination of a display position of the content image 40 are realized by using different markers. Here, the first marker 10 used to determine a content is required to differ for each content. On the other hand, the second marker 20 used to determine a display position of the content image 40 may be realized by a single marker common to a plurality of contents. However, if the same marker is used for the determination of a display position of the content image 40 and the determination of a content, an image common to a plurality of contents cannot be used as the content image 40.

In this point, according to the information processing apparatus 2000 of the present example embodiment, the determination of a display position of the content image 40 and the determination of a content are realized by using different markers, and thus the second marker 20 used to determine a display position of the content image 40 can be realized by a single marker common to a plurality of contents. In a case where a single marker common to a plurality of contents realizes the second marker 20, a process of detecting the second marker 20 in order to determine a display position of the content image 40 can be performed more simply than in a case where the differing second marker 20 is to be used for each piece of content. As a result, there is an advantage that the time required for a process of detecting the second marker 20 is shortened or an advantage that computation cost for this process is reduced.

As mentioned above, since different markers are used for the determination of a content and the determination of a display position of the content image 40, the degree of freedom of an installation location of a marker, a realization method of a marker, or the like is increased compared with a case where the determination is realized by using a single marker. For example, as will be described later, it is possible that the second marker 20 is attached to a user's body, and the first marker 10 used for the determination of a content is provided in a location separated from the user's body. As will be further described later, the second marker 20 may be drawn or printed in advance, and the first marker 10 may be displayed on a display screen as an image.

Figure 2:
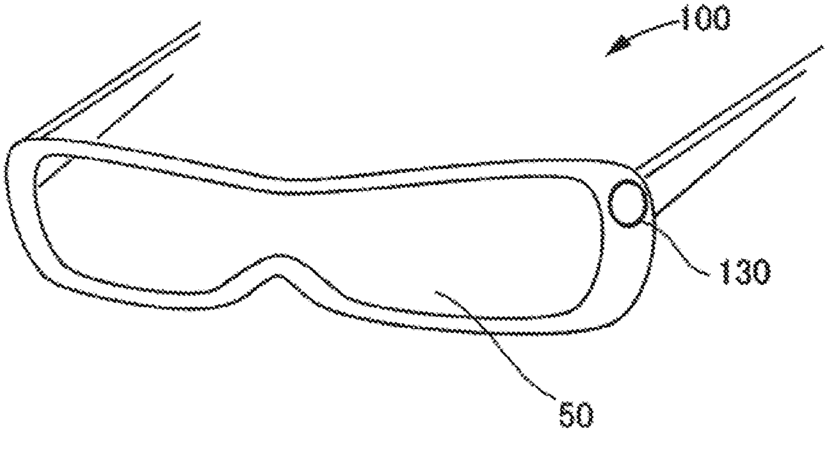
FIG. 2 is a diagram illustrating a head mounted display.

The information processing apparatus 2000 is implemented by using, for example, a head mounted display. FIG. 2 is a diagram illustrating a head mounted display. A head mounted display 100 is a spectacle type head mounted display. The head mounted display 100 has the display screen 50. The display screen 50 is a transmissive display screen (a display screen through which light is transmitted) provided in a lens portion of the head mounted display 100. As described above, the content image 40 is displayed on the display screen 50.

A camera 130 is a camera generating the captured image 30. In FIG. 2, the camera 130 is attached near the lens of the head mounted display 100. Note that, as will be described later, the display screen 50 is not limited to a transmissive display screen. An installation position of the camera 130 is not limited to the head mounted display 100.

Figure 3:
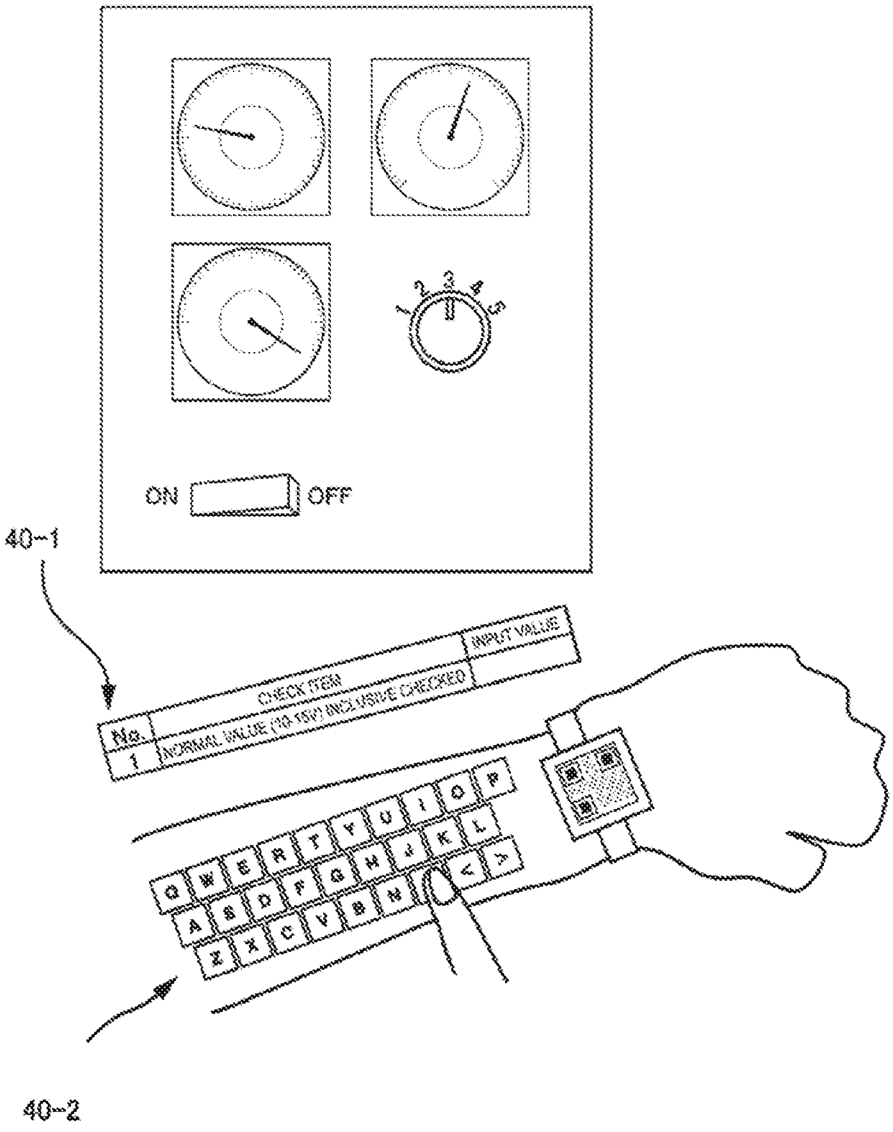
FIG. 3 is a diagram illustrating a user's view in the information processing apparatus.

FIG. 3 is a diagram illustrating a user's view in the information processing apparatus 2000. A content image 40-1 and a content image 40-2 are images displayed on the display screen 50 by the information processing apparatus 2000. On the other hand, other objects (equipment, the user's arm, and the like) are real objects.

By using the information processing apparatus 2000 as mentioned above, the user can perform various tasks or the like by using information provided by the information processing apparatus 2000. In the example illustrated in FIG. 3, the user checks a facility while viewing information provided by the information processing apparatus 2000.

Here, the operation of the information processing apparatus 2000 described with reference to FIGS. 1 to 3 is an example for better understanding of the information processing apparatus 2000, and an operation of the information processing apparatus 2000 is not limited to the above-described example. Details or variations of an operation of the information processing apparatus 2000 will be described later.

Hereinafter, the information processing apparatus 2000 of the present example embodiment will be described in more detail.

<Example of Functional Configuration>

Figure 4:
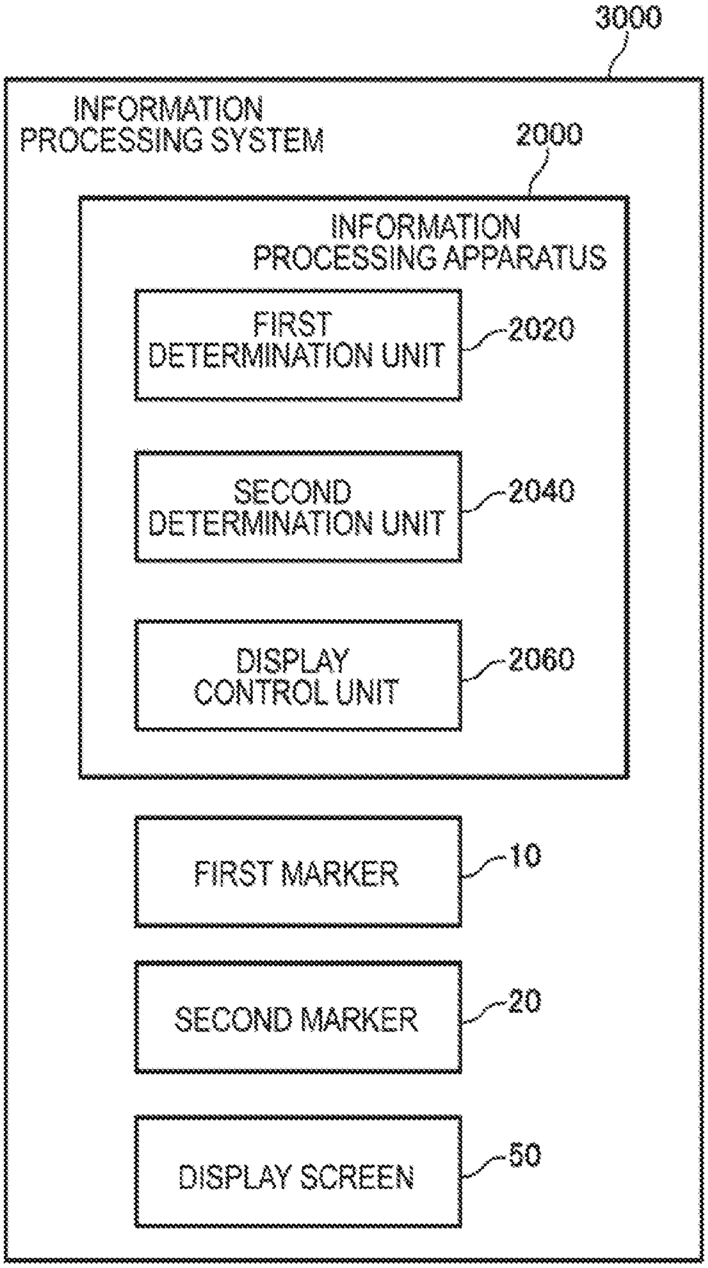
FIG. 4 is a diagram illustrating a functional configuration of the information processing apparatus.

FIG. 4 is a diagram illustrating a functional configuration of an information processing system 3000 including the information processing apparatus 2000. The information processing system 3000 has the first marker 10, the second marker 20, the display screen 50, and the information processing apparatus 2000. The information processing apparatus 2000 includes a first determination unit 2020, a second determination unit 2040, and a display control unit 2060. The first determination unit 2020 detects the first marker 10 from the captured image 30, and determines a content corresponding to the detected first marker 10. The second determination unit 2040 detects the second marker 20 from the captured image 30, and determines a display position of the content image 40 on the display screen 50 on the basis of the detected second marker 20. The display control unit 2060 displays the content image 40 at the determined display position in the display screen 50.

In a case where a device 60, which will be described later, is used to realize the first marker 10 or the second marker 20, the information processing system 3000 may include the device 60.

<Example of Hardware Configuration of Information Processing Apparatus 2000>

Each functional configuration unit of the information processing apparatus 2000 may be realized by hardware (for example, a hardware electronic circuit), or may be realized by a combination of hardware and software (for example, a combination of an electronic circuit and a program for controlling the electronic circuit). Hereinafter, a further description will be made of a case where each functional configuration unit of the information processing apparatus 2000 is realized by a combination of hardware and software.

A computer 1000 is various computers. For example, the computer 1000 is a head mounted display, a personal computer (PC), a server machine, a tablet terminal, or a smart phone. The computer 1000 may be a dedicated computer designed to realize the information processing apparatus 2000, or may be a general purpose computer.

Figure 5:
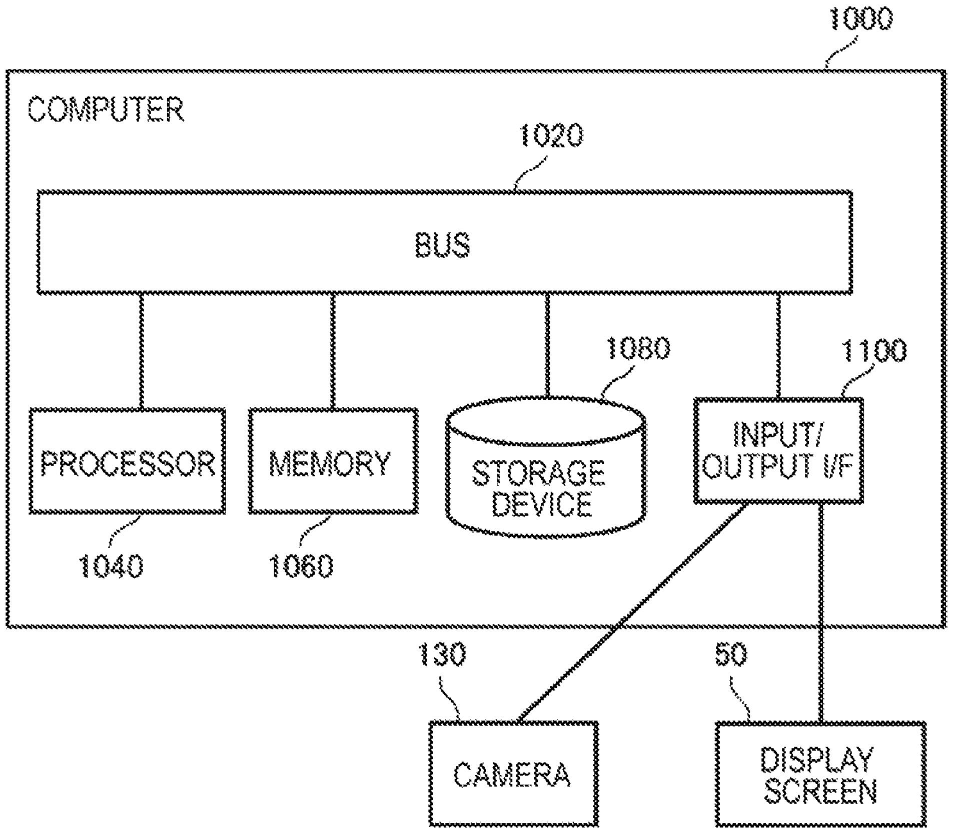
FIG. 5 is a diagram illustrating a configuration of a computer implementing the information processing apparatus.

FIG. 5 is a diagram illustrating a configuration of the computer 1000 realizing the information processing apparatus 2000. The computer 1000 includes a bus 1020, a processor 1040, a memory 1060, a storage device 1080, and an input/output interface 1100. The bus 1020 is a data transmission path for transmitting and receiving data among the processor 1040, the memory 1060, and the storage device 1080. However, a method of connecting the processor 1040 and the like to each other is not limited to connection using a bus. The processor 1040 is, for example, a calculation processing device such as a central processing unit (CPU) or a graphics processing unit (GPU). The memory 1060 is a primary storage device realized by a random access memory (RAM) or the like. The storage device 1080 is a secondary storage device realized by a hard disk, a solid state drive (SSD), a memory card, or a read only memory (ROM). However, the storage device 1080 may be realized by the same hardware as hardware used to realize a primary storage device such as a RAM.

The input/output interface 1100 connects the computer 1000 to input and output devices. In FIG. 5, the input/output interface 1100 is connected to, for example, the camera 130 generating the captured image 30 or the display screen 50.

The storage device 1080 stores a program module for realizing each function of the information processing apparatus 2000. The processor 1040 executes each program module so as to realize each function corresponding to the program module.

A hardware configuration of the computer 1000 is not limited to the configuration illustrated in FIG. 5. For example, each program module may be stored in the memory 1060. In this case, the computer 1000 may not include the storage device 1080. A method of connecting the camera 130 to the computer 1000 is not limited to a connection method using the input/output interface 1100. For example, the camera may be connected to the computer 1000 through a network. In this case, the computer 1000 has a network interface for connection to the network.

<<Head Mounted Display 100>>

The head mounted display 100 is any head mounted display having the display screen 50 located in a user's view. For example, the display screen 50 is a transmissive display screen as described above. In this case, the user can view both a real object in front of the display screen 50 and an image displayed on the display screen 50.

In another example, the display screen 50 may be a non-transmissive display screen. In this case, the head mounted display 100 displays an image captured by a camera imaging the periphery (for example, in a face direction of the user) of the user and an image (for example, the content image 40) representing other objects in an overlapping manner on the display screen 50. The user can view a state in which the other objects overlap the peripheral scenery by viewing the display screen 50. Note that the "camera imaging the periphery of the user" may be the camera 130 used to image a marker, or may be a camera provided additionally.

<<Camera 130>>

The camera 130 is any camera generating a plurality of captured images 30 by performing repeated imaging. For example, each captured image 30 is a video frame configuring videos. Note that the camera 130 may be two-dimensional (2D) camera, or may be a three-dimensional (3D) camera.

In order to determine a display position of the content image 40 by using a captured image generated by the camera 130, it is preferable to recognize a relationship between an imaging direction of the camera 130 and a front direction of the user's face in advance. Thus, for example, the camera 130 is provided in a location where the imaging direction of the camera 130 and the front direction of the user's face substantially match each other. In a case where the display screen 50 is included in a transmissive head mounted display, for example, the location is the vicinity of the lens of the head mounted display 100 described in FIG. 2. In a case where the display screen 50 is included in a non-transmissive head mounted display, and a camera imaging peripheral scenery displayed on the display screen 50 is the camera 130, an imaging direction of the camera 130 and a front direction of the user's face substantially match each other.

However, the camera 130 may be provided in a location where an imaging direction of the camera 130 does not substantially match a front direction of the user's face. For example, in this case, the camera 130 is provided at any location of the head of the user (not limited to head). In this case, a relationship (for example, an angle difference) between the imaging direction of the camera 130 and the front direction of the user's face is defined as a parameter in advance. The information processing apparatus 2000 recognizes the relationship between the imaging direction of the camera 130 and the front direction of the user's face by using the parameter. The parameter may be set in the information processing apparatus 2000 in advance, or may be stored in a storage device which can be accessed from the information processing apparatus 2000.

For example, the camera 130 is attached to an object (for example, clothes of the user or an employee ID card held from the neck of the user) worn by the user. In another example, the camera 130 may be provided on a wall or the like of a room in which the user uses the information processing apparatus 2000. In this case, an imaging range (an imaging direction or a zoom ratio) of the camera 130 is preferably changeable through remote control by a remote controller or the like.

<<Display Screen 50>>

There are various embodiments of realizing the display screen 50 controlled by the display control unit 2060. For example, as described above, the display screen 50 is a display screen provided in the head mounted display 100. In another example, the display screen 50 is a projection surface (a wall or the like) onto which an image is projected by a projector. In this case, the display control unit 2060 controls the projector to project the content image 40 at a specific position in the projection surface. In another example, the display screen 50 is a display screen of a display device such as a liquid crystal display.

<Flow of Process>

Figure 6:
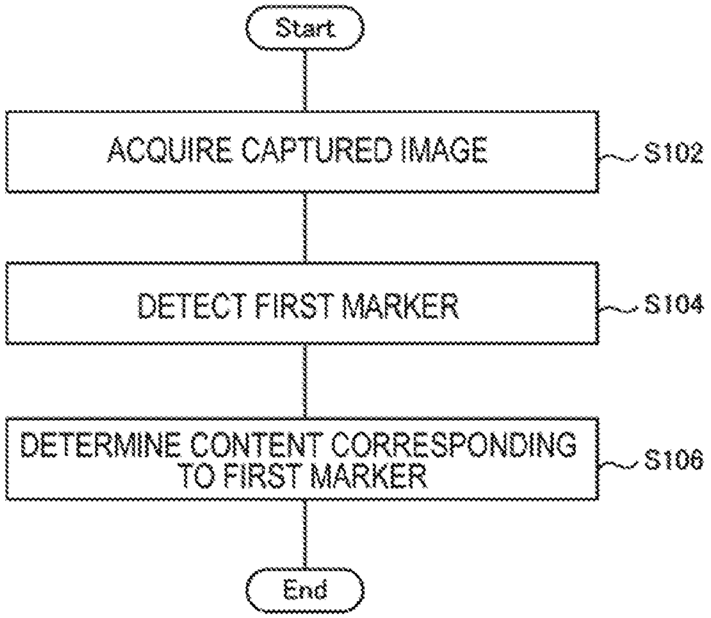
FIG. 6 is a flowchart illustrating a flow of processes performed by a first determination unit of Example Embodiment 1.

FIG. 6 is a flowchart illustrating a flow of processes performed by the first determination unit 2020 of Example Embodiment 1. The first determination unit 2020 acquires the captured image 30 (S102). The first determination unit 2020 detects the first marker 10 from the acquired captured image 30 (S104). The first determination unit 2020 determines content corresponding to the detected first marker 10 (S106).

Figure 7:
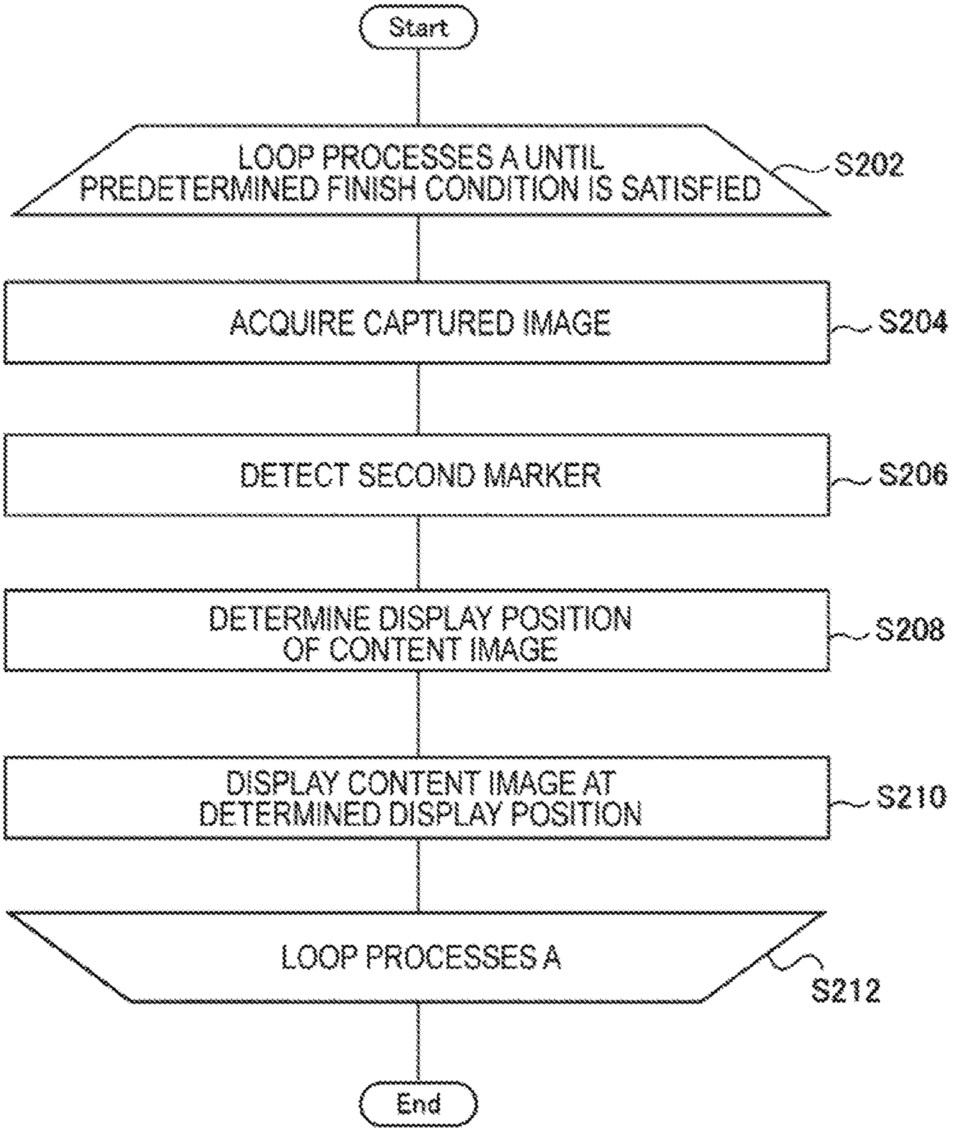
FIG. 7 is a flowchart illustrating a flow of processes performed by a second determination unit and a display control unit of Example Embodiment 1.

FIG. 7 is a flowchart illustrating a flow of processes performed by the second determination unit 2040 and the display control unit 2060 of Example Embodiment 1. Steps S202 to S212 correspond to loop processes A which are repeatedly performed until a predetermined termination condition is satisfied. In S202, the second determination unit 2040 determines whether or not the termination condition is satisfied. In a case where the termination condition is satisfied, the process in FIG. 7 is finished. On the other hand, in a case where the termination condition is not satisfied, the process in FIG. 7 proceeds to S204.

The second determination unit 2040 acquires the captured image 30 (S204). The second determination unit 2040 detects the second marker 20 from the captured image 30 (S206). The second determination unit 2040 determines a display position of the content image 40 on the display screen 50 on the basis of the detected second marker 20 (S208). The display control unit 2060 displays the content image 40 corresponding to the content determined on the basis of the first marker 10, at the display position in the display screen 50 determined in S208 (S210). Step S212 is the termination of the loop processes A, and thus the process in FIG. 7 returns to S202.

Here, the respective captured images 30 acquired in S204 which is repeatedly executed are different captured images 30. For example, the second determination unit 2040 acquires the latest captured image 30 at the time of executing S204. In another example, the second determination unit 2040 may collectively acquire a plurality of captured images 30 generated by the camera 130, or may process the plurality of captured images 30 in the order of their generation.

According to the flow of the process illustrated in FIG. 7, in a case where a position of the second marker 20 is changed over time, a display position of the content image 40 is changed to follow the change of the position. For example, as will be described later, in a case where the second marker 20 is attached to the user's body, a display position of the content image 40 is changed to follow the motion of the user's body. Therefore, convenience of the information processing apparatus 2000 used by the user is improved.

Any termination condition of the loop processes A may be adopted. For example, the termination condition is to receive a predetermined input operation from the user. In another example, the termination condition is that a state of the information processing apparatus 2000 (for example, a state of an operating system or an application executed in the computer 1000 realizing the information processing apparatus 2000) becomes a predetermined state.

<Method of Acquiring Captured Image 30: S102 and S204>

The information processing apparatus 2000 acquires the captured image 30 (S102 and S204). The information processing apparatus 2000 may acquire the captured image 30 according to any method. For example, the information processing apparatus 2000 acquires the captured image from the camera 130. In this case, the information processing apparatus 2000 is communicably connected to the camera 130.

In a case where the camera 130 stores the captured image 30 in an external storage device, the information processing apparatus 2000 may acquire the captured image 30 from the storage device. In this case, the information processing apparatus 2000 is communicably connected to the storage device.

Note that the information processing apparatus 2000 may acquire all of the captured images 30 generated by the camera 130, or may acquire only some of the captured images. In the latter case, for example, the information processing apparatus 2000 acquires some video frames (for example, a single video frame per predetermined number of video frames) configuring videos generated by the camera 130. In addition, the information processing apparatus 2000 may acquire all of the captured images 30 generated by the camera 130, and then the first determination unit 2020 or the second determination unit 2040 may use only some of the acquired captured images 30.

<As to Content>

Various contents may be used as a content determined on the basis of the first marker 10. For example, the content is an application as illustrated in FIG. 1. In this case, the first marker 10 is used to select an application that the user wants to execute. Any application may be used as an application determined on the basis of the first marker 10. For example, the application is an application for playing videos, an application for capturing an image, a web browser, or the like.

In another example, the content is an input interface. In this case, the first marker 10 is used to select an input interface that the user wants to use. Any input interface may be used as an input interface determined on the basis of the second marker 20. For example, the input interface is a keyboard, a numeric keypad, a selection button, or the like.

<As to Content image 40>

The display control unit 2060 displays the content image 40 corresponding to the content determined on the basis of the first marker 10, on the display screen 50. For example, the content image 40 is statically determined (uniquely determined) according to the content. For example, in a case where the content is an input interface, the content image 40 may be realized by a specific image representing the input interface. For example, in a case where the input interface is a keyboard, the content image 40 is an image of a keyboard.

In a case where the content image 40 corresponding to the content is statically determined, for example, a path name of the content image 40 is associated with an identifier of the content in advance. The display control unit 2060 displays, on the display screen 50, the content image 40 having the path name associated with the identifier of the content determined by the first determination unit 2020. In another example, a path name of the content image 40 may be used as an identifier of the content. In this case, the content image 40 is determined by the first determination unit 2020 determining an identifier of the content.

The content image 40 corresponding to the content may be dynamically determined. For example, in a case where the content is an application, the content image 40 is an image generated by the application. For example, in a case where the content is an application for playing videos, the content image 40 includes a video frame. The content image 40 changes according to the progress of reproduction of videos. Therefore, the display control unit 2060 acquires the content image 40 generated by the application being the content, and displays the content image 40 on the display screen 50.

The number of content images 40 corresponds to a single content may be one, or may be plural. For example, in a case where the content is a web browser, the content image 40 representing a window of the web browser and the content image 40 representing an input interface for performing an input operation on the web browser may be displayed on the display screen 50.

<As to First Marker 10>

The first marker 10 is any marker used for determination of a content. For example, the first marker 10 is a mark having a feature value associated with an identifier of a content. The feature value of the first marker 10 is a value representing a feature of an appearance (a shape, a pattern, or a color) of the first marker 10. Note that the mark mentioned here indicates any character, graphic, or symbol. For example, a logo or a picture may be used as the first marker 10.

Figure 8:
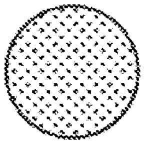
FIG. 8 is a diagram illustrating information associating an identifier of content with a feature value of a first marker in a table form.
Figure 8:
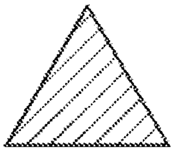
Figure 8:
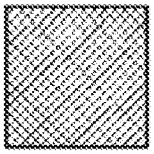

FIG. 8 is a diagram illustrating information associating an identifier of a content with a feature value of the first marker 10 in a table form. The table is referred to as a table 200. The table 200 has two columns such as a content identifier 202 and a feature value 204. The content identifier 202 represents an identifier of a content. The feature value 204 represents a feature value of the first marker 10 corresponding to the identifier of the content. For better understanding of description, in FIG. 8, the feature value 204 is illustrated as a graphic.

The first determination unit 2020 detects a mark having a feature value (for example, a feature value of a predetermined value or greater in similarity) identical or similar to the feature value 204 from the captured image 30, and determines the content on the basis of the identifier associated with the detected feature value 204. For example, in a case where the first marker 10 is defined in the table 200 illustrated in FIG. 8, when a circular mark having a dot pattern is detected from the captured image 30, the first determination unit 2020 determines the content having an identifier of c001.

In another example, the first marker 10 may be various codes in which an identifier of a content are encoded. A code is, for example, a barcode or a QR code (registered trademark). In this case, the first determination unit 2020 decodes a code included in the captured image 30 so as to compute an identifier of a content. The content is determined on the basis of the computed identifier. Note that a well-known technique may be used as a technique of detecting a code included in an image and decoding the code.

In another example, the first marker 10 may be a character string representing an identifier of a content. Note that the character string mentioned here may be a numerical value string. In this case, the first determination unit 2020 recognizes a character string included in the first marker 10 so as to compute an identifier of a content. The content is determined on the basis of the computed identifier. Note that a well-known technique may be used as a technique of detecting a character string included in an image and recognizing the character string.

For example, the first marker 10 is an image displayed on a display screen. The display screen is provided in, for example, a device attached to the user. The device is any electronic device having a function of displaying an image on the display screen. Note that the device may be directly attached to the user's body, or may be attached onto a dress or the like.

Figure 9:
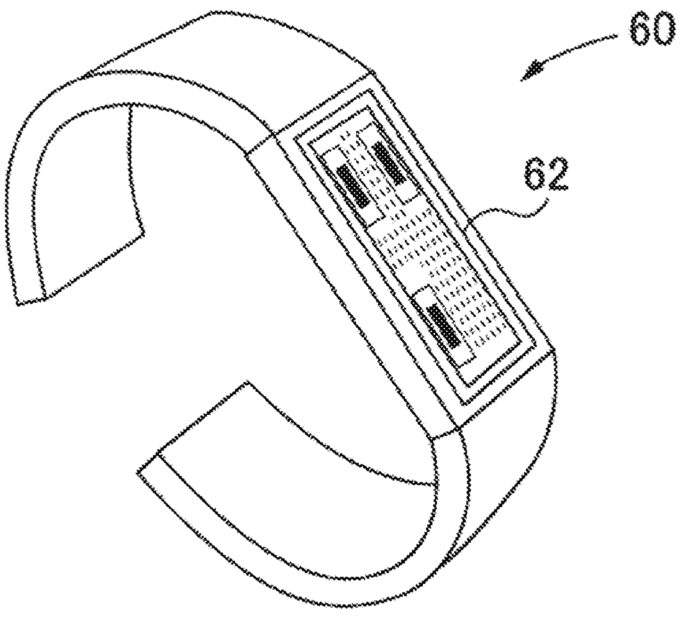
FIG. 9 is a diagram illustrating a device on which the first marker is displayed.

FIG. 9 is a diagram illustrating the device 60 on which the first marker 10 is displayed. The device 60 is a watch type device worn on the user's wrist, and has a display screen 62 in a portion corresponding to a dial of a watch. The device 60 may display any image on the display screen 62.

For example, the user operates the device 60 so that the first marker 10 corresponding to the desired content is displayed on the display screen 62. For example, in a case where the display screen 62 is a touch panel, the user may operate the device 60 by operating the display screen 62. Thereafter, the user causes the camera 130 to image the first marker 10. In the above-described way, the captured image 30 including the first marker 10 corresponding to the desired content is generated. The first determination unit 2020 detects the first marker 10 from the captured image 30, and thus the content that the user wants to use is determined by the first determination unit 2020.

Note that a method of changing the first marker 10 displayed on the display screen 62 is not limited to a method of operating a touch panel of the device 60. For example, in a case where the information processing apparatus 2000 is realized by using the head mounted display 100, the user may change the first marker 10 displayed on the display screen 62 by performing an input operation on the head mounted display 100. In this case, for example, the head mounted display 100 performs communication with the device 60, and thus the first marker 10 displayed on the display screen 62 is changed according to the input operation performed on the head mounted display 100.

Note that the first marker 10 may be an image which is stored in advance in the device 60, or may be an image stored in an external storage device of the device 60. In a case where the first marker 10 is to be selected by using the head mounted display 100, the device 60 may receive the first marker 10 transmitted from the head mounted display 100 so as to acquire the first marker 10.

The first marker 10 is not limited to the above-described images. For example, the first marker 10 is a mark provided in advance on an attachment attached to the user's body. Any attachment may be used as the attachment. For example, the attachment is a watch type attachment. In another example, the attachment is a ring, a wristband, a cloth worn by the user, or a seal. Note that the attachment includes the above-described device.

The attachment includes not only an attachment directly attached to the user's body but also an object further attached to an object attached to the user's body. For example, an attachment attached to a dial portion or a band portion of a watch type attachment worn by the user is also referred to as an attachment. Therefore, "providing the first marker 10 on an attachment" includes not only providing the first marker 10 on an attachment (for example, a watch) directly attached to the user's body, but also providing the first marker 10 on an attachment (for example, an attachment attached to a watch) attached to another attachment.

Here, the first marker 10 attached to an uneven portion such as a dial portion of a watch is preferably formed by using a flexible object. For example, the first marker 10 is drawn or printed on a resin, a plate-shaped object made of cardboard, or a plate-shaped object formed by compression-molding lumber or wood chips. The first marker 10 may be provided as a seal stuck to the plate-shaped object. The first marker 10 may be drawn or printed on a surface of a flexible object formed to coat an attachment.

Figure 10:
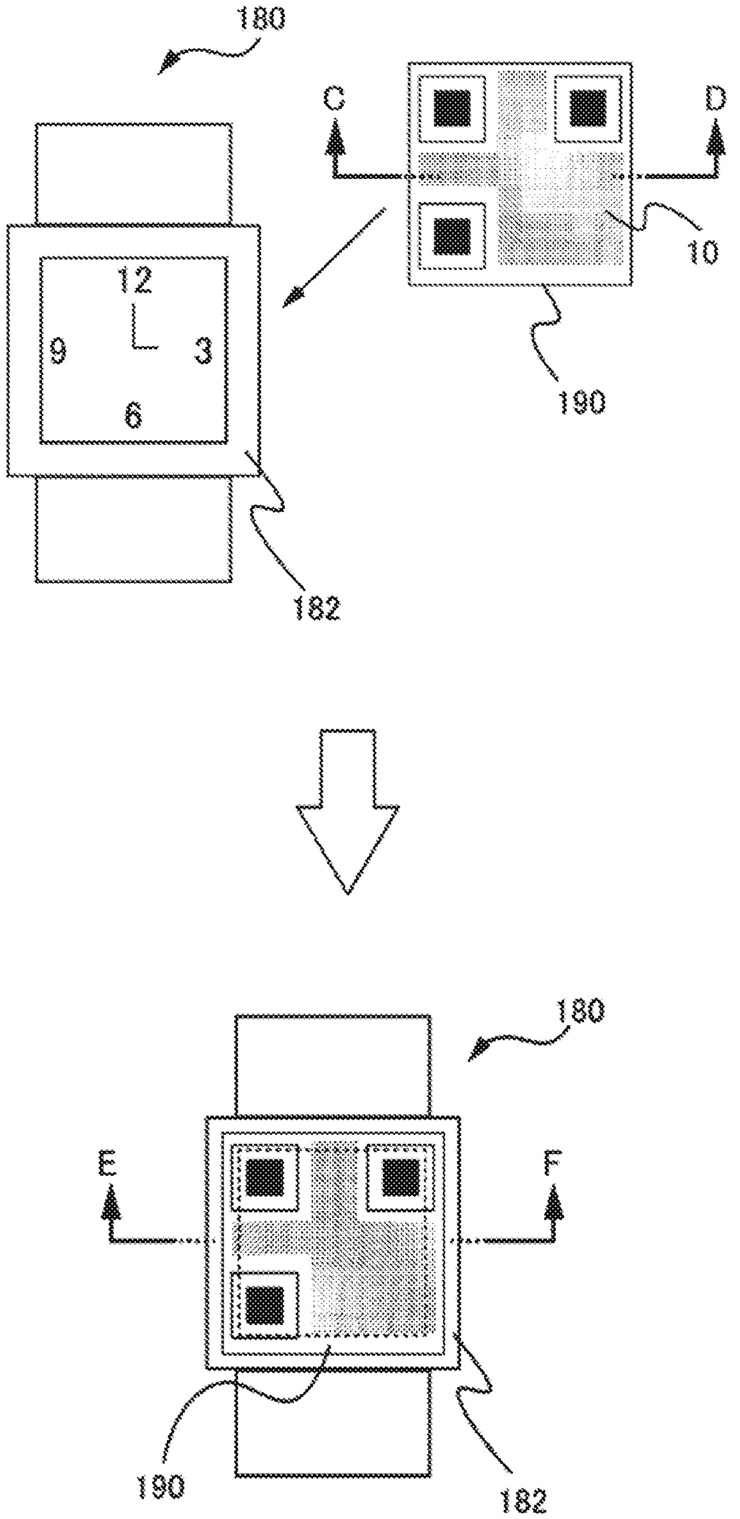
FIG. 10 is a diagram illustrating the first marker attached to a dial portion of a watch.

FIG. 10 is a diagram illustrating the first marker 10 attached to a dial portion of a watch. The first marker 10 is provided on a flexible plate-shaped object 190. A watch 180 has a dial 182. The plate-shaped object 190 is fitted to the dial 182.

Figure 11A:
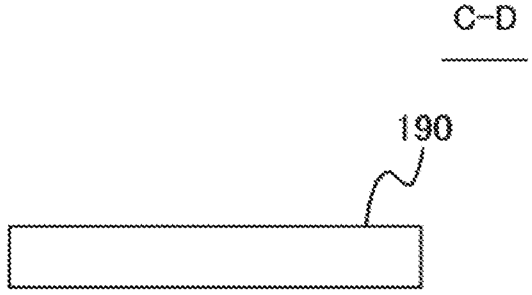
FIG. 11 are sectional views corresponding to FIG. 10.

FIG. 11 are sectional views corresponding to FIG. 10. FIG. 11A is a sectional view of the plate-shaped object 190 taken along the line C-D. As illustrated in FIG. 11A, a section of the plate-shaped object 190 is rectangular in a normal state. In other words, a shape of the plate-shaped object 190 in a normal state is a cuboidal shape.

Figure 11B:
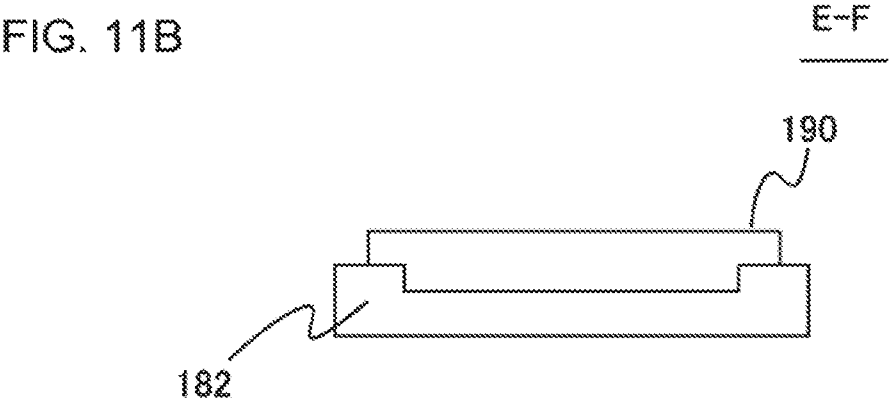

FIG. 11B is a sectional view taken along the line E-F in the dial 182 fitted with the plate-shaped object 190. As illustrated in the figure, the plate-shaped object 190 is partially contracted in accordance with the shape of the dial 182 so as to be fitted to the dial 182.

In a case where there is an unevenness in an attachment such as a watch worn by the user, the first marker 10 becomes also uneven due to the influence of the unevenness of the attachment if, for example, the first marker is directly provided on the attachment, or a seal on which the first marker 10 is provided is directly adhered to the attachment. The first marker 10 being uneven as mentioned above is harder to be detected from the captured image 30 than the first marker 10 in a normal state.

Therefore, as illustrated in FIG. 11, it is preferable that the first marker 10 is provided on a flexible object such as the plate-shaped object 190, and the object is attached to an attachment. In the above-described way, since it is possible to prevent the first marker 10 from becoming uneven, the accuracy of a process of detecting the first marker 10 from the captured image 30 is higher than a case of directly providing the first marker 10 at an uneven location.

Generally, such a flexible object is frequently manufactured at low cost. Thus, the first marker 10 required to use the information processing apparatus 2000 can be provided at low cost. Therefore, for example, there may be an operation in which the first marker 10 is provided as a bonus item of a certain product (for example, a toy included in snacks), and content related to the product can be used by the information processing apparatus 2000. From the viewpoint of manufacturing cost, it is also preferable to provide the first marker 10 on an object capable of being attached to an attachment such as a watch.

Figure 12:
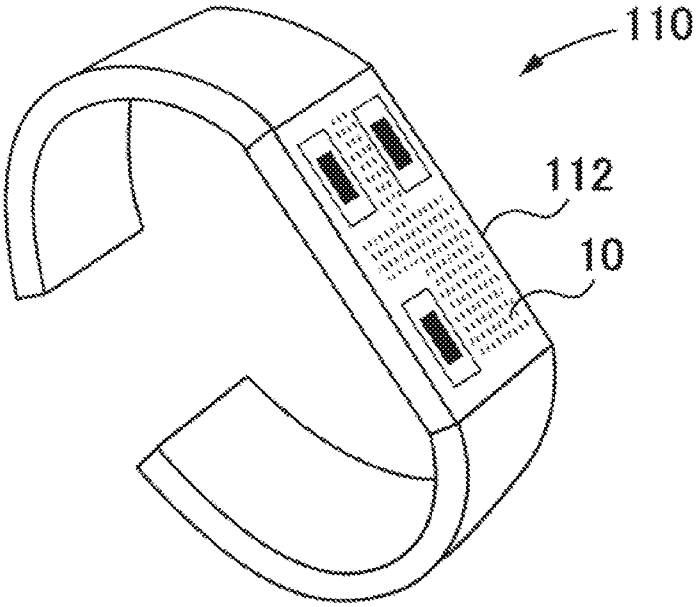
FIG. 12 is a diagram illustrating a watch type attachment on which the first marker is printed in advance.

The first marker 10 may be manually drawn or printed on an attachment. For example, in a watch type attachment, the first marker 10 is drawn or printed in advance on a portion corresponding to a dial of a watch. FIG. 12 is a diagram illustrating a watch type attachment 110 on which the first marker 10 is printed in advance. The attachment 110 has a plate-shaped object 112 which is a portion corresponding to a dial of a watch. The plate-shaped object 112 is made of, for example, a resin. The first marker is printed in advance on the plate-shaped object 112.

Note that, as a method of drawing or printing a mark on a certain object, not only a method of applying paint such as ink to a surface of the object but also various methods may be used. For example, a method of forming a mark by carving the object (so-called carved seal), a method of forming a mark by pressing the object, or a method of forming the object on which a mark is provided by pouring a raw material (for example, a resin) of the object into a mold may be used. For example, in FIG. 12, the first marker 10 may be formed according to a method of carving a pattern representing the first marker 10 into a resin plate forming the plate-shaped object 112.

In a case where the first marker 10 is provided on an attachment in advance, for example, the attachment is prepared for each content provided to a user. The user carries an attachment corresponding to the desired content, and uses the content. For example, in a case where an application supporting a user's work is the content, the user selects an attachment to be worn by the user according to work to be performed. In another example, in a case where an attachment is realized by a seal, the user selects the seal corresponding to the desired content, sticks the seal to any location (for example, a dial portion of a watch type attachment or a sleeve), and uses the information processing apparatus 2000.

Figure 13:
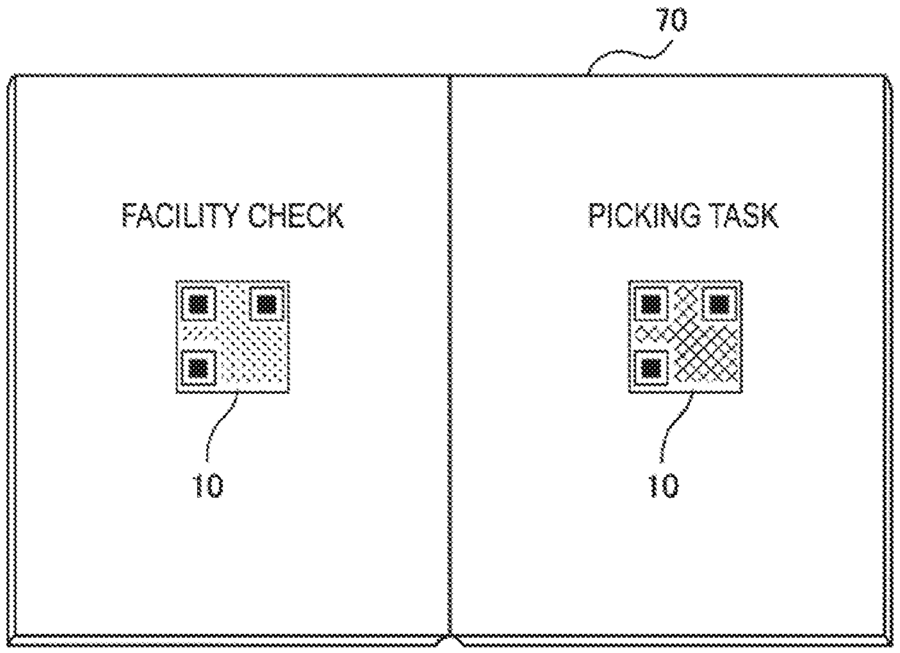
FIG. 13 is a diagram illustrating a book on which the first marker is printed.

The first marker 10 may be a mark drawn or printed in advance on objects (paper, a cloth, a desk, or a wall) other than an attachment. For example, a book or a menu on which the first marker 10 is printed is prepared. FIG. 13 is a diagram illustrating a book 70 on which the first marker 10 is printed. The user causes the camera 130 to image the first marker 10 printed on the book 70, and thus uses the desired content. For example, the book 70 is a book in which a list of content or input interfaces available in the information processing apparatus 2000 is shown.

In another example, the first marker 10 corresponding to an application may be provided in a manual for the application, or the first marker 10 corresponding to an application supporting work or an input interface used for the work may be provided in a manual for the work of the user.

In another example, the first marker 10 corresponding to a content is provided on a wall or a desk provided in a place where the content is used. The user using the content causes the camera 130 to image the first marker 10 provided in the usage place. In the above-described way, for example, the user can easily use the application supporting the work to be performed in the place.

Figure 14:
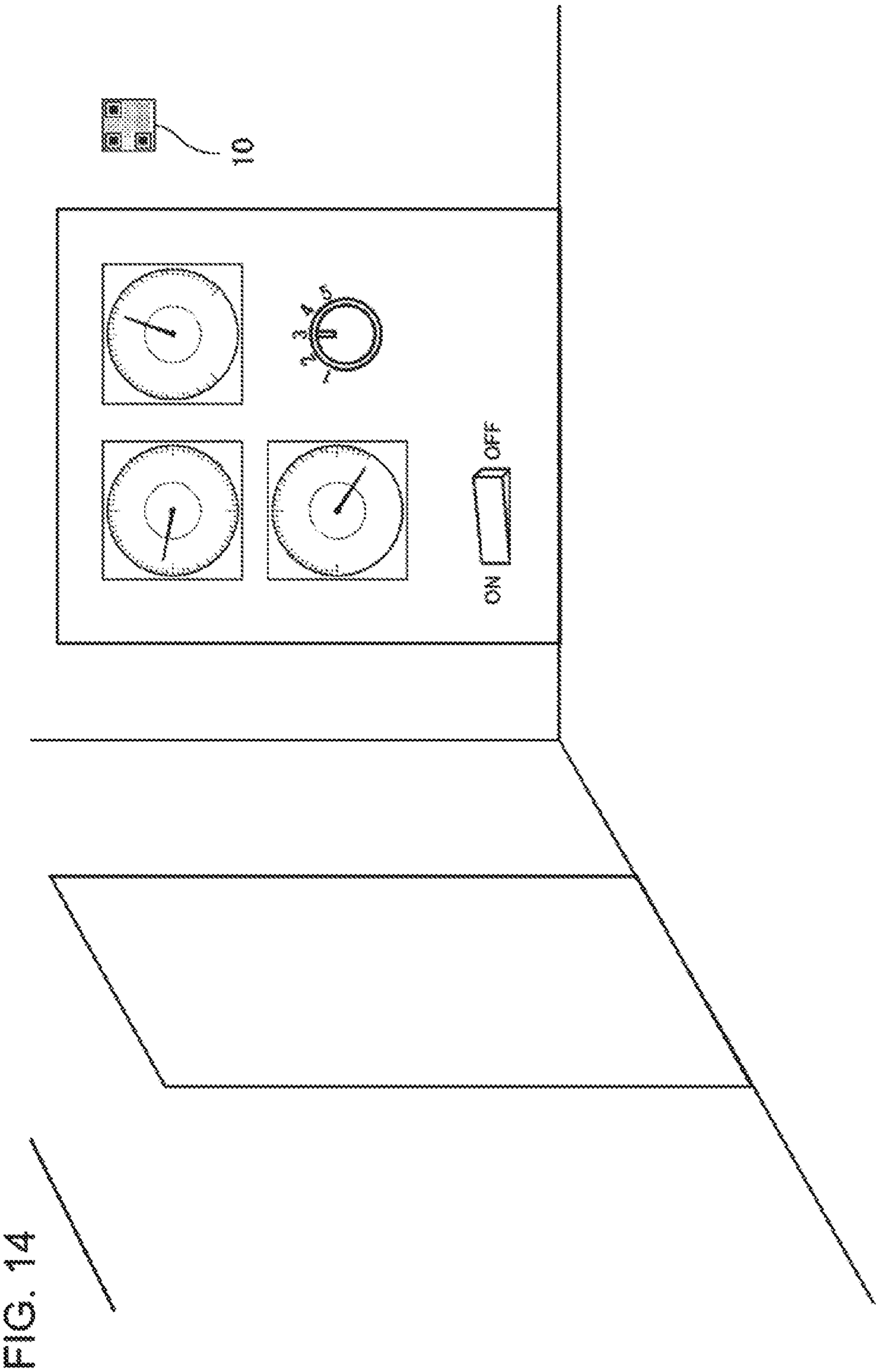
FIG. 14 is a diagram illustrating the first marker provided in a content usage place.

FIG. 14 is a diagram illustrating the first marker 10 provided in a content usage place. In this example, the first marker 10 for determining an application supporting checking of a facility is provided on a wall on which the facility to be checked is installed. The user causes the first marker 10 to be imaged by the camera 130, and can thus use the application for checking the facility.

Here, as described above, the first marker 10 may be realized by an image, or may be realized by others. According to an embodiment of realizing the first marker 10 as an image, it becomes easier to change the first marker 10 for each content to be used. It is not necessary to draw or print the first marker 10 in advance. Note that, in a case where the first marker 10 is realized by an image, a display screen on which an image is displayed is more suitable to be formed where the image is viewed using reflected light of sunlight or illumination light, such as an electronic paper, than be formed where the image is viewed by the display screen emitting light or the image is viewed by a backlight of the display screen emitting light and blocking the light. This is because, in the form where the display screen emits light, halation occurs in a case where a difference between light emitted from the display screen and ambient light is great (for example, in a case where the periphery of the first marker 10 is dark), and thus the first marker 10 may possibly be unclearly imaged in the captured image 30. In a case of the display screen in the form where the image is viewed using reflected light, the halation does not occur, and thus detection accuracy of the first marker 10 is increased. There is an advantage that a distance (a distance between the camera 130 and the first marker 10) at which the first marker 10 can be detected becomes longer. Such advantages are advantages also achieved in the form where the first marker 10 is realized by others than an image.

<As to Second Marker 20>

The second marker 20 is any marker used to determine at least a position thereof in the captured image 30. For example, the second marker 20 is a marker which can be used to determine a three-dimensional coordinate system. The marker which can be used to determine a three-dimensional coordinate system is, for example, an augmented reality (AR) marker. However, a marker which can be used to determine a three-dimensional coordinate system is not limited to an Armarker as long as the marker can be used to determine three directions orthogonal to each other from a certain reference point (for example, the center of the marker). The second marker 20 may be an object used to determine a position thereof in the captured image 30, and is not necessarily required to be able to be used to determine a three-dimensional coordinate system.

For example, the second marker 20 is provided on an attachment attached to a user's body. In the same manner as an attachment attached with the first marker 10, as an attachment attached with the second marker 20, for example, a watch type attachment, a ring, a wristband, a cloth worn by the user, or a seal may be used. In the same manner as an attachment attached with the first marker 10, as an attachment attached with the second marker 20, an object (for example, the plate-shaped object 190 or a coated object) further attached to an object attached to the user's body may be used. Note that an attachment attached with the first marker 10 and an attachment attached with the second marker 20 may be the same object, or may be different objects.

Figure 15A:
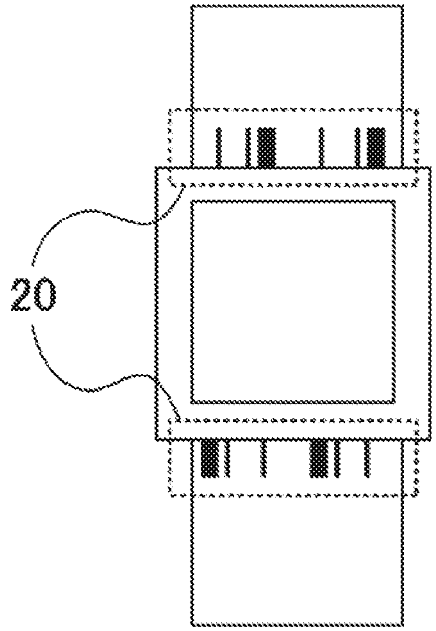
FIG. 15 are diagrams illustrating a second marker drawn or printed on a device.
Figure 15B:
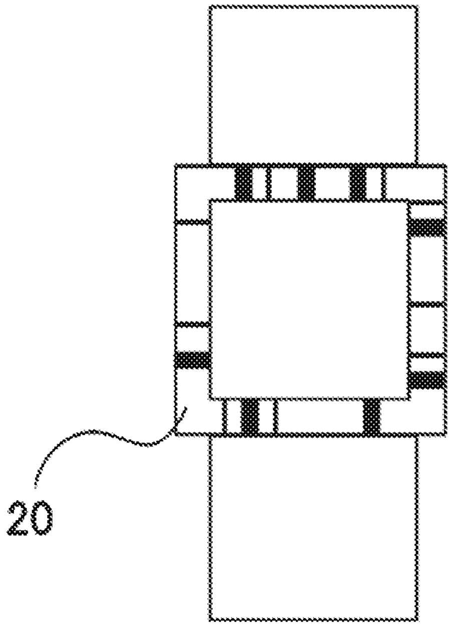

The second marker 20 is, for example, a predetermined mark (a character, a graphic, or a symbol having a predetermined feature value) drawn or printed on an attachment. FIG. 15 are diagrams illustrating the second marker 20 drawn or printed on the device 60. In FIG. 15A, the second marker 20 is realized in a predetermined pattern printed on a band portion of the device 60. In FIG. 15B, the second marker 20 is realized in a predetermined pattern printed on the periphery (a portion corresponding to a bezel in a dial of a watch) of the display screen 62.

In another example, the second marker 20 provided on an attachment may be realized in a shape of the whole or a part of the attachment.

In another example, the second marker 20 may be realized by an image displayed by an attachment attached to the user's body. The attachment attached to the user's body may be the device 60, or may be others. Examples of attachments other than the device 60 are as described above. The second marker 20 may be manually drawn on the attachments, or may be printed thereon.

In another example, an attachment may be a light emitting device (a light emitting diode (LED) or the like) which emits light. Note that, in a case where the second marker 20 is a light emitting device, and in a case where a three-dimensional coordinate system is defined on the basis of the second marker 20, the second marker 20 is configured by using three or more light emitting devices. The second determination unit 2040 computes a position of light emitted from each of the three or more light emitting devices included in the captured image 30. The second determination unit 2040 may determine a three-dimensional coordinate system on the basis of the position of each light emitting device. Note that a well-known method may be used as a method of determining a three-dimensional coordinate system by using three or more objects, and thus a description of a specific method will not be repeated.

The second marker 20 is not limited to a mark provided on an attachment. For example, the second marker 20 may be a predetermined mark directly drawn on the user's body. In another example, the second marker 20 may be a predetermined part (the back of the hand) of the user's body.

The second marker 20 may be provided at any location of the user's body. For example, the second marker 20 is provided on the user's arm portion. Here, the arm portion indicates a portion from the fingertips of the user to the shoulder thereof.

In order to detect the second marker 20 from the captured image 30, the second determination unit 2040 uses information (hereinafter, marker information) for determining the second marker 20. For example, the marker information indicates a feature value of the second marker 20. The second determination unit 2040 detects an object or an image having the feature value indicated by the marker information from the captured image 30, and thus detects the second marker 20. The marker information may be set in the second determination unit 2040 in advance, or may be stored in a storage device which can be accessed from the second determination unit 2040.

Here, it is preferable to realize the second marker 20 by a single marker which is not dependent on contents. By doing so, as described above, it is possible to make a process of detecting the second marker 20 simpler. As a result, there is an advantage that the time required for a process of detecting the second marker 20 is shortened or an advantage that computation cost for this process is reduced.

As described above, the second marker 20 may be realized by an image, or may be realized by others. The embodiment where the second marker 20 is realized by an image has an advantage that it is not necessary to draw or print the second marker 20 in advance.

Note that, in a case where the second marker 20 is realized by an image, in the same manner as in a case where the first marker 10 is realized by an image, a display screen on which an image is displayed is more suitable to be formed where the image is viewed using reflected light of sunlight or illumination light, such as an electronic paper, than be formed where the image is viewed by the display screen emitting light or the image is viewed by a backlight of the display screen emitting light and blocking the light. Advantages thereof are the same as those in a case of the first marker 10. The advantages are the same for cases where the second marker 20 is realized by others than an image.

<As to Relationship Between Positions where First Marker 10 and Second Marker 20 are Provided>

Figure 16:
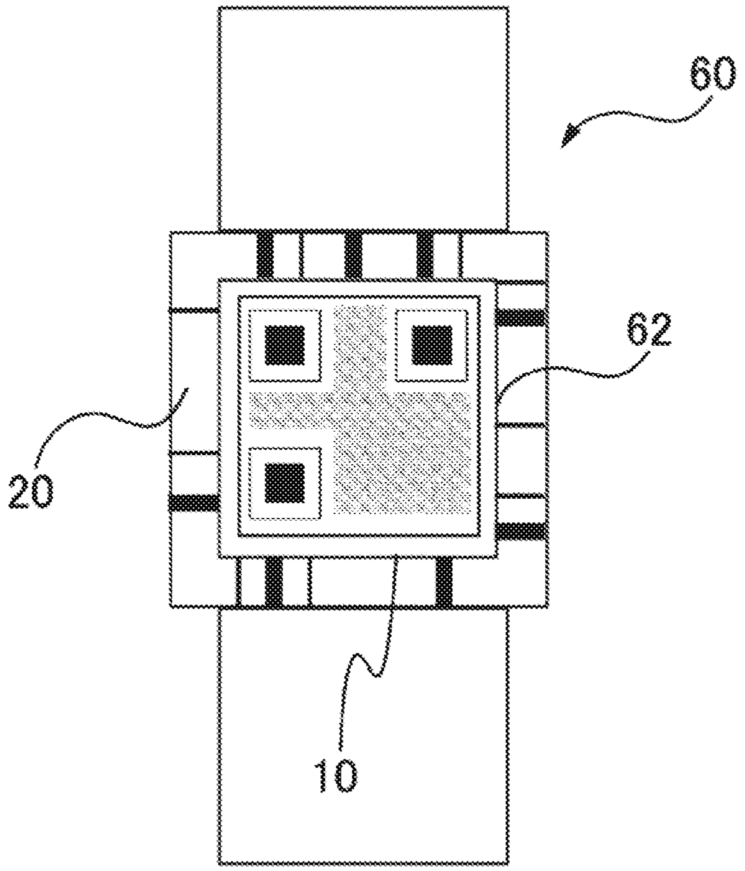
FIG. 16 is a diagram illustrating a case where both of the first marker and the second marker are provided on a device.

As described above, each of the first marker 10 and the second marker 20 may be provided at various locations. For example, both of the first marker 10 and the second marker 20 are provided on the device 60. FIG. 16 is a diagram illustrating a case where both of the first marker 10 and the second marker 20 are provided on the device 60. In FIG. 16, the first marker 10 is an image displayed on the display screen 62. On the other hand, the second marker 20 is a mark printed on the periphery of the display screen 62.

The first marker 10 to be imaged by the camera 130 differs for each content desired by the user to use. Thus, in a case where the first marker 10 is provided on the device 60, it is preferable that the first marker 10 is realized by an image displayed on the display screen 62, and thus the first marker 10 can be changed according to the user's operation. On the other hand, the second marker 20 is a marker for determining a display position of the content image 40, and may not be changed according to the user's operation. Thus, as illustrated in FIG. 16, the second marker 20 may be a mark which is provided on the device 60 in advance. Therefore, in the example illustrated in FIG. 16, the first marker 10 is realized by an image displayed on the display screen 62, and the second marker 20 is realized by a mark provided in advance on the device 60.

As illustrated in FIG. 16, the second marker 20 is provided on the periphery of the first marker 10, and thus the second marker 20 can be made larger than the first marker 10. Here, it can be said that the second marker 20 used for determination of the display position of the content image 40 has to be detected more frequently by the information processing apparatus 2000 than the first marker 10 used for determination of a content. The ease of detection of the second marker 20 to be frequently detected should be equal to or more than the ease of detection of the first marker 10. Therefore, it is preferable to make the second marker 20 larger than the first marker 10 (for example, as illustrated in FIG. 16, the second marker 20 is provided on the periphery of the first marker 10). However, the second marker 20 is not necessarily required to be larger than the first marker 10, sizes thereof may be the same as each other, or the first marker 10 may be made larger than the second marker 20.

Note that, although the first marker 10 is realized by an image and the second marker 20 is realized by a mark provided in advance in the example illustrated in FIG. 16, it is not necessarily limited to this realization method. For example, both of the first marker 10 and the second marker 20 may be realized by images displayed on the display screen 62. In this case, first, the user operates the device 60 such that the first marker 10 corresponding to the desired content is displayed on the display screen 62, and causes the camera 130 to image the first marker 10. As a result, the desired content is determined. Then, the user further operates the device 60 such that the second marker 20 is displayed on the display screen 62, and causes the camera 130 to image the second marker 20. As a result, a display position of the content image 40 is determined, and the content image 40 is displayed at the determined position.

In addition, both of the first marker 10 and the second marker 20 may be realized by marks which are provided in advance on an attachment worn by the user. For example, in a watch type attachment, the first marker 10 is printed in advance in the vicinity of the center of a portion corresponding to a dial, and the second marker 20 is printed in advance on the periphery of the portion.

Note that, in the above-described respective examples, the first marker 10 is located near the center of the attachment, and the second marker 20 is located on the periphery thereof. However, a positional relationship between the first marker 10 and the second marker 20 may be any positional relationship in which the markers do not overlap each other. The first marker 10 and the second marker 20 may partially overlap each other in a range in which there is no influence to detection thereof.

Figure 17A:
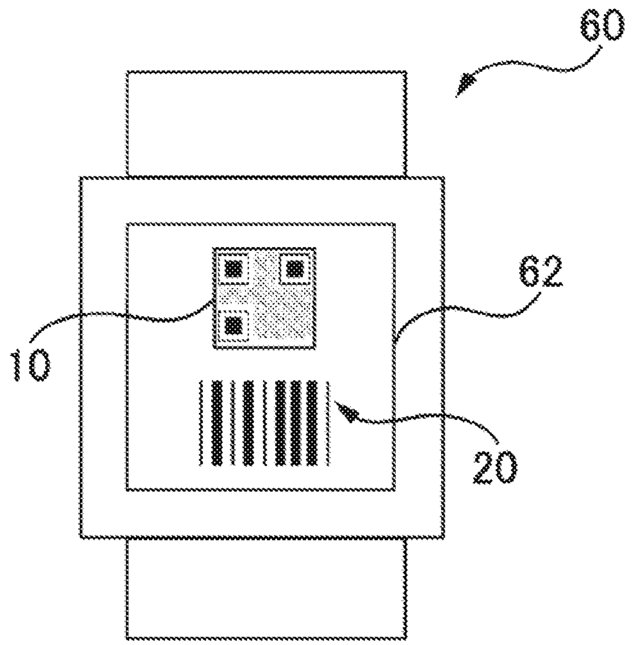
FIG. 17 are diagrams illustrating other examples of the first marker and the second marker provided on an identical attachment.

FIG. 17 are diagrams illustrating other examples of the first marker 10 and the second marker 20 provided on the same attachment. In FIG. 17A, the first marker 10 and the second marker 20 are vertically provided side by side when seen in a plan view. In FIG. 17A, regarding the first marker 10 and the second marker 20, 1) each thereof may be an image displayed on the display screen, 2) one thereof may be an image displayed on the display screen, and the other may be a mark drawn or printed in advance, or 3) both thereof may be marks drawn or printed in advance.

Figure 17B:
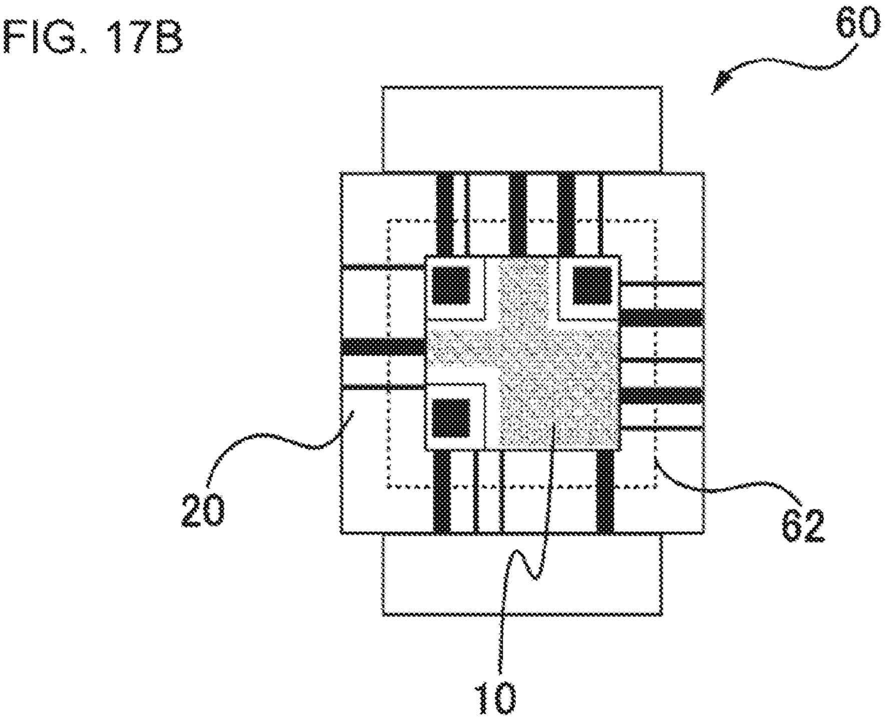

In FIG. 17B, the first marker 10 is an image displayed on the display screen 62 of the device 60. The second marker 20 is printed on a seal stuck to cover a part of the display screen 62. A dot line represents a frame of the display screen 62 covered with the seal. As mentioned above, in FIG. 17B, a part of the first marker 10 is not seen.

According to the method (the method using the table 200) in which the first marker 10 is detected on the basis of the feature value of the first marker 10, even though a part of the first marker 10 is lacked in the captured image 30, it is possible to detect the first marker 10 as long as the first marker 10 can be viewed (included in the captured image 30) to the extent where the similarity between the feature value of the first marker 10 included in the captured image 30 and the feature value of the first marker 10 prepared in advance becomes equal to or more than a predetermined threshold value. Therefore, the first determination unit 2020 can detect the first marker 10 even though a part of the first marker 10 is hidden by the second marker 20 as illustrated in FIG. 17B.

Note that, in FIG. 17B, a part of the first marker 10 is not viewed due to the second marker 20, but, conversely, a part of the second marker 20 may not be viewed due to the first marker 10.

Positions of the first marker 10 and the second marker 20 may be different from each other in a depth direction of when the attachment is seen in a plan view. In other words, a plane represented by the first marker 10 and a plane represented by the second marker 20 may not be exist on the same plane. Further in other words, a plane represented by the first marker 10 and a plane represented by the second marker 20 may be different from each other in positions in directions perpendicular to the planes.

Figure 18A:
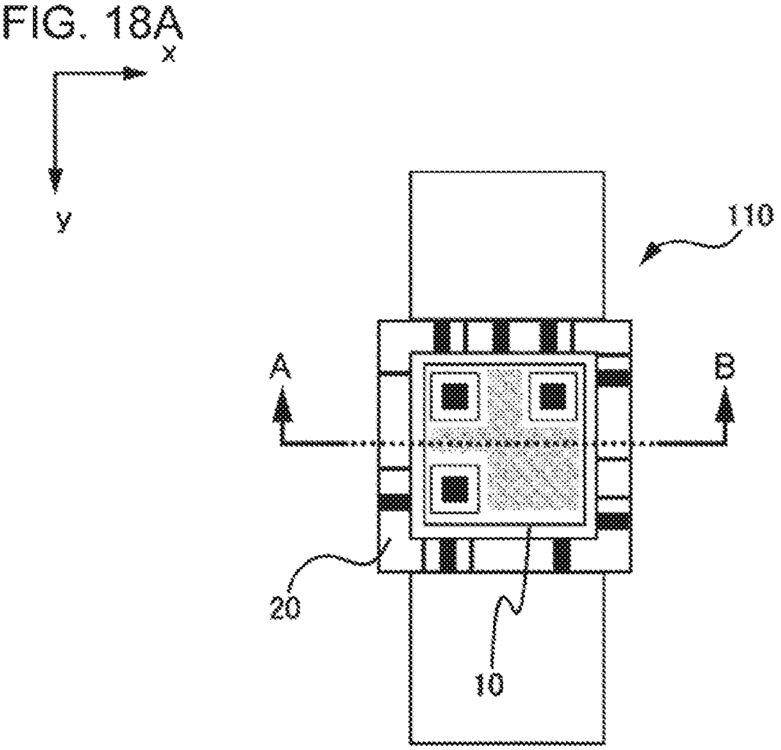
FIG. 18 are diagrams illustrating the first marker and the second marker of which positions in a depth direction of when the attachment is seen in a plan view are different from each other.
Figure 18B:
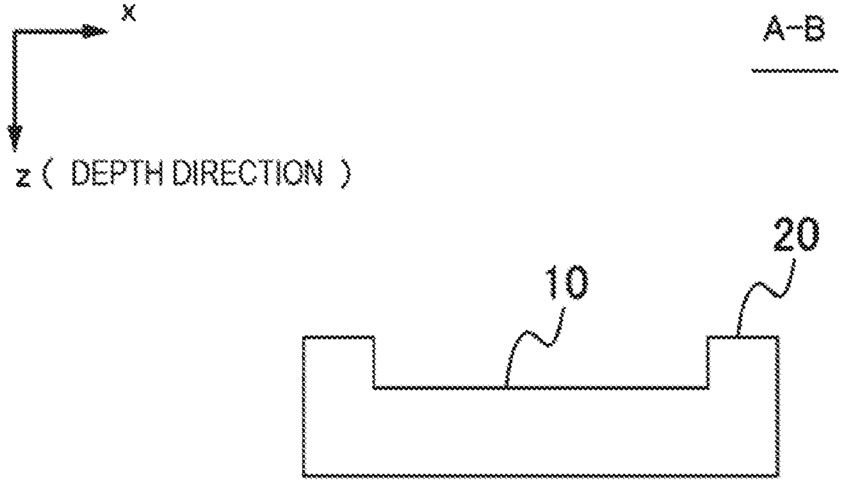

FIG. 18 are diagrams illustrating the first marker 10 and the second marker 20 whose positions in a depth direction of when an attachment is seen in a plan view are different from each other. FIG. 18A is a plan view of the watch type attachment 110, and FIG. 18B is a sectional view of the attachment 110 taken along the line A-B. As illustrated in FIG. 18B, in the attachment 110, a position where the first marker 10 is provided and a position where the second marker 20 is provided are different from each other in a z direction (a depth direction when seen in a plan view, that is, a thickness direction of the attachment 110). In a case where the attachment 110 is the device 60, for example, the first marker 10 is provided on the display screen 62, the second marker 20 is provided on the periphery (a portion corresponding to a bezel of a dial of a watch) of the display screen 62, and the display screen 62 is provided behind the periphery when seen in a plan view. In other words, the position where the first marker 10 is provided and the position where the second marker 20 is provided are different from each other in a direction perpendicular to a plane of the display screen 62.

Figure 19:
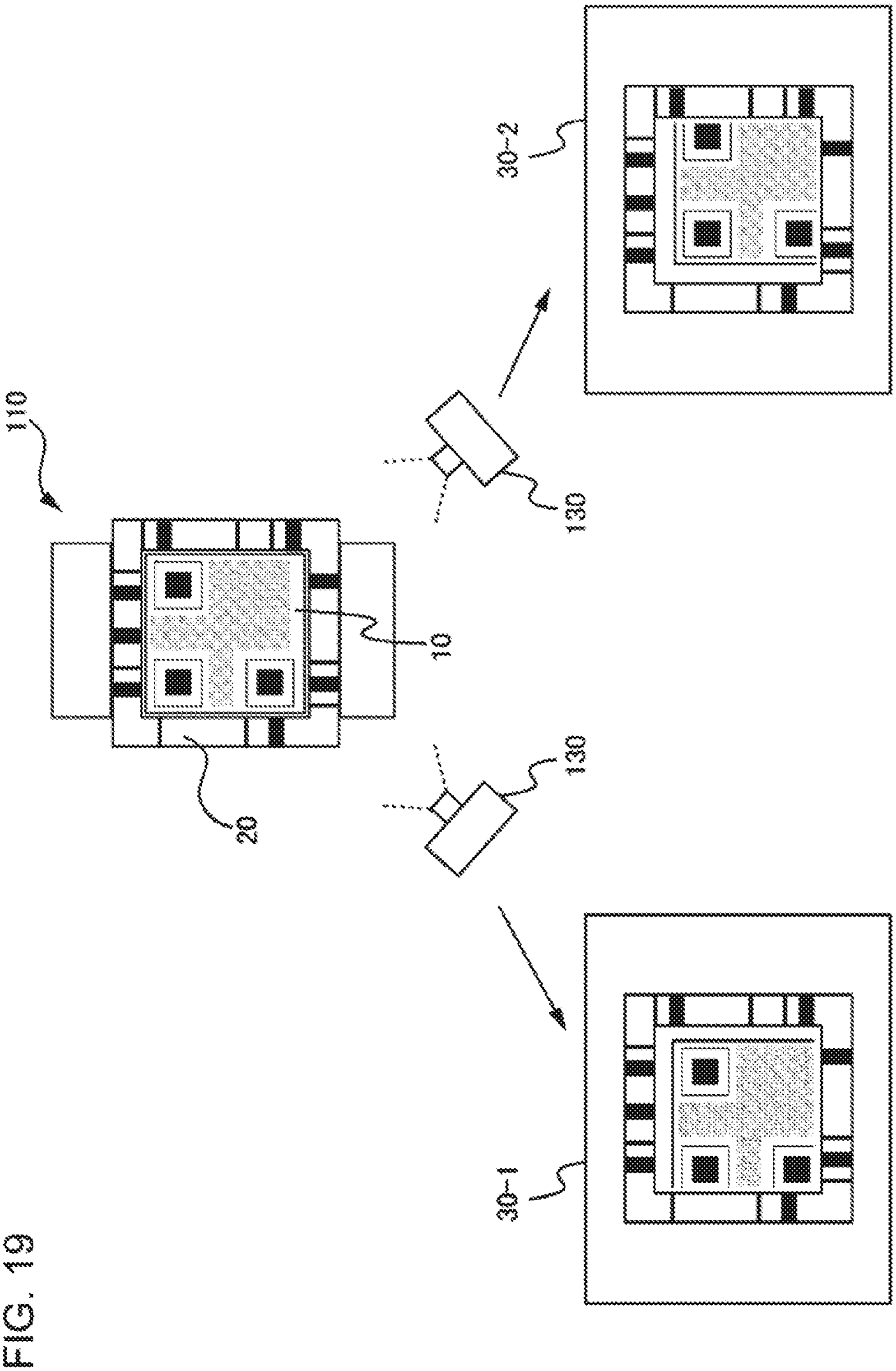
FIG. 19 is a diagram illustrating a scene in which the first marker included in a captured image differs due to a direction of imaging the first marker.

In a visual field of the camera 130 imaging the attachment 110, the first marker 10 is located behind the second marker 20. Thus, the first marker 10 included in the captured image 30 differs depending on a direction in which the camera 130 images the first marker 10 (depending on a direction in which the user views the attachment 110). FIG. 19 is a diagram illustrating a scene in which the first marker 10 included in the captured image 30 differs depending on a direction in which the first marker 10 is imaged. In the captured image 30-1, the attachment 110 is imaged in a left obliquely downward direction when seen in a plan view. Thus, a part of the lower left portion of the first marker 10 is not included in the captured image 30-1. On the other hand, in the captured image 30-2, the attachment 110 is imaged in a right obliquely downward direction when seen in a plan view. Thus, a part of the lower right portion of the first marker 10 is not included in the captured image 30-2.

As mentioned above, in a case where even the identical first marker 10 differs in a shape or a pattern included in the captured image 30 depending on a direction in which the first marker 10 is imaged by the camera 130 (for example, a part of the first marker 10 is lacked), a single marker 10 may be used in common for a plurality of contents. In this case, the first determination unit 2020 determines the content on the basis of the first marker 10 (a part of the first marker 10) included in the captured image 30. For example, in the example illustrated in FIG. 19, in the case of the captured image 30-1, a keyboard is to be determined as the content, whereas in the case of the captured image 30-2, a numeric keypad is to be determined as the content. In the above-described way, the user can use the desired content by changing a direction in which the camera 130 images the first marker 10 (for example, a direction in which the user views the first marker 10) according to the desired content. Therefore, the convenience of the information processing apparatus 2000 is improved. In addition, the number of first markers 10 corresponding to the number of contents can be reduced, and thus the time and effort to prepare the first marker 10 are reduced. In addition, in a case where the first marker 10 is realized by an image, a storage region in which the first marker 10 is stored can be reduced, and, in a case where the first marker 10 is drawn or printed in advance, a space required to provide the first marker 10 can be reduced.

<Timings of Detecting First Marker 10 and Second Marker 20>

The first marker 10 and the second marker 20 may be detected at any timing or frequency. Hereinafter, a preferable timing or frequency will be exemplified.

FIRST EXAMPLE

Figure 20:
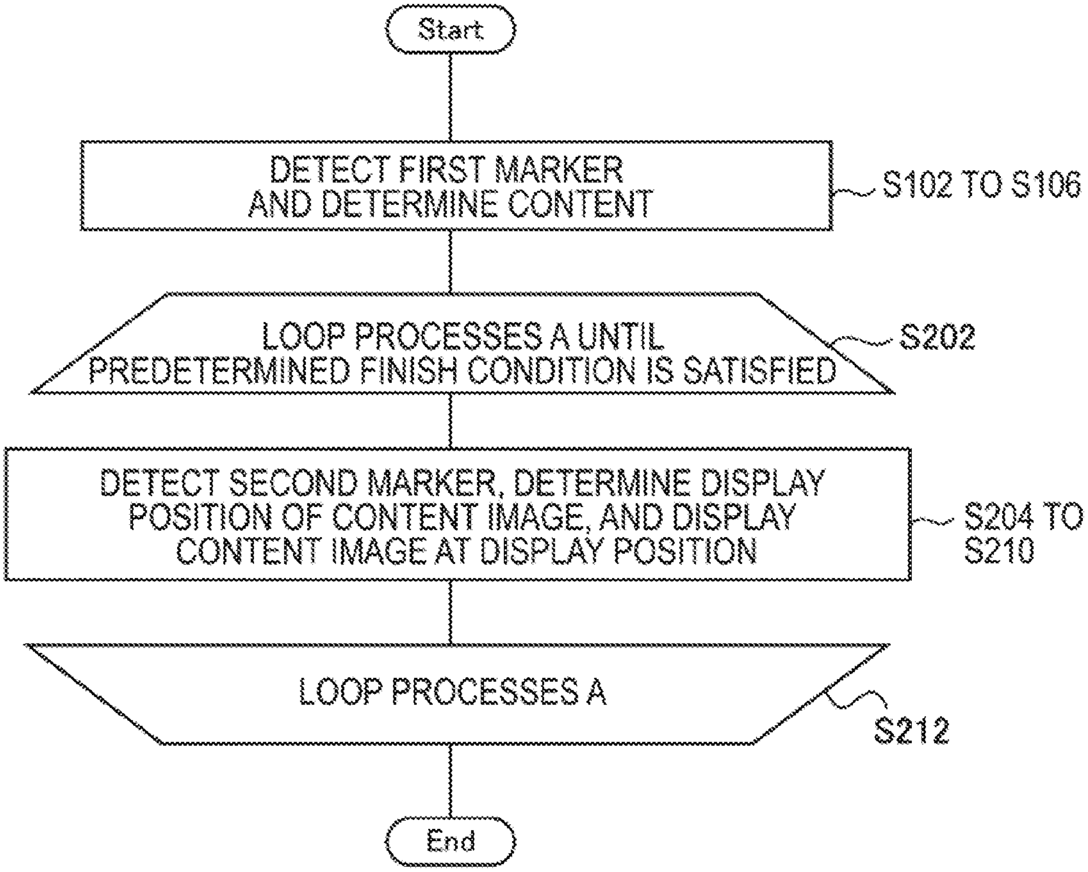
FIG. 20 is a flowchart illustrating timings of detecting the first marker and the second marker.

In this example, detection of the first marker 10 and detection of the second marker 20 are performed at different timings. FIG. 20 is a flowchart illustrating timings of detecting the first marker 10 and the second marker 20. First, the first determination unit 2020 performs a process of detecting the first marker 10 (S102 to S106 in FIG. 5). During that time, the second marker 20 is not detected. In the above-described way, a processing load on the information processing apparatus 2000 can be reduced.

In a case where the first determination unit 2020 has detected the first marker 10, then, the second determination unit 2040 detects the second marker 20, and the display control unit 2060 displays the content image 40 (S202 to S212 in FIG. 6).

The termination condition for the loop processes A is that, for example, as described above, the user performs a predetermined input operation, or a state of the information processing apparatus 2000 becomes a predetermined state. In a case where the content determined on the basis of the first marker 10 is an application, the meaning of that the information processing apparatus 2000 becomes in a predetermined state is, for example, that the application terminates. In another example, in a case where the content determined on the basis of the first marker 10 is an input interface, the meaning of that the information processing apparatus 2000 becomes in a predetermined state is, for example, that an input operation using the input interface is completed. By adopting such a termination condition, a process performed by the information processing apparatus 2000 can be caused to automatically transition from the determination of a display position of the content image 40 to the determination of a content, while using the termination of the application or the completion of the input operation as a trigger.

In another example, the predetermined termination condition is that the second marker 20 is not detected for a predetermined time or more (in the loop processes A of a predetermined number of times or more). For example, in a case where the head mounted display 100 is used, the fact that the second marker 20 has not been detected for a predetermined time or more means that the second marker 20 has been out of the user's view for the predetermined time or more. Therefore, by adopting this termination condition, when the user desires to use another content, the user can cause a process performed by the information processing apparatus 2000 to transition to the determination of a content by performing an easy operation of excluding the second marker 20 from the view.

Here, during execution of the loop processes A, the detection of the first marker 10 is not performed. In the above-described way, a processing load on the information processing apparatus 2000 can be reduced.

In a case where the predetermined termination condition is satisfied, the process in FIG. 20 is finished. In this case, for example, the information processing apparatus 2000 performs the process in FIG. 20 again. In the above-described way, the process is repeatedly performed in the flow that 1) the first marker 10 is detected, and 2) detecting the second marker 20 and displaying the content image 40 are repeatedly performed until the predetermined termination condition is satisfied.

SECOND EXAMPLE

Figure 21:
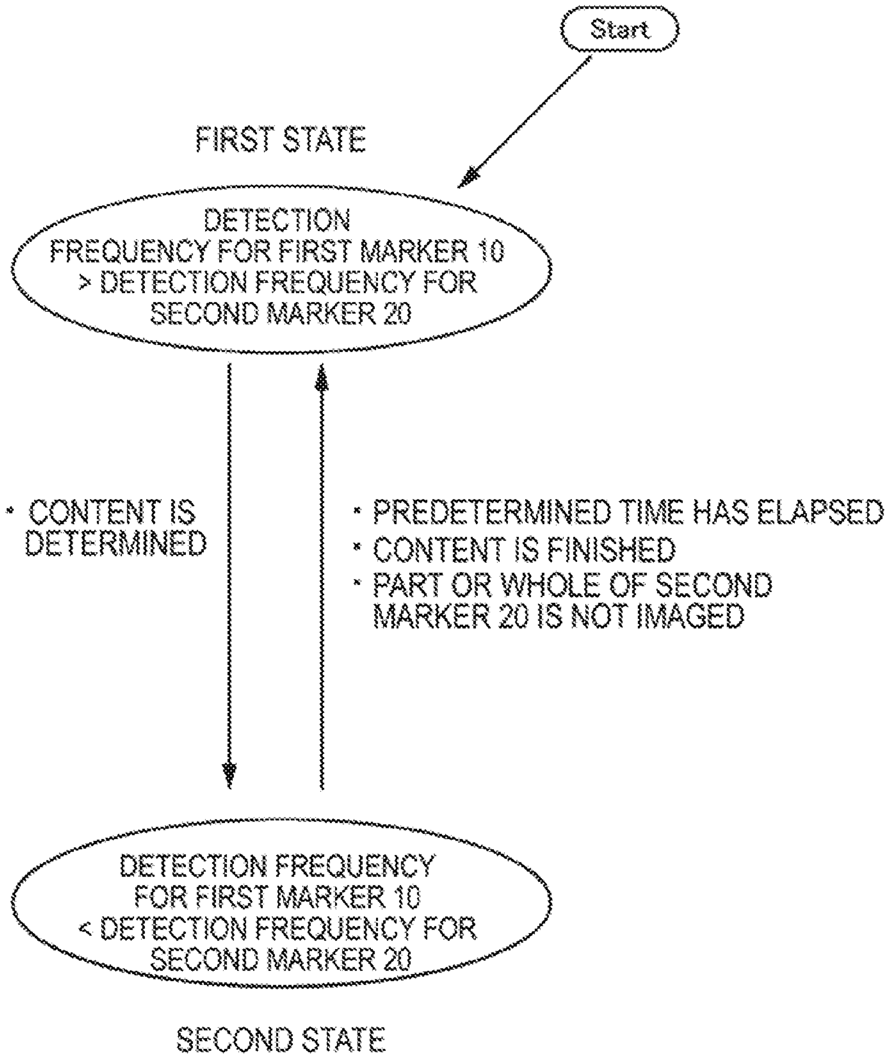
FIG. 21 is a diagram illustrating a scene in which a state of the information processing apparatus transitions between a first state and a second state.

In this example, a process of detecting the first marker 10 and a process of detecting the second marker 20 are performed in parallel. Note that, the information processing apparatus 2000 transitions between two states of 1) the first state in which a frequency of performing a process of detecting the first marker 10 is higher than a frequency of performing a process of detecting the second marker 20 and 2) the second state in which the frequency of performing a process of detecting the second marker 20 is higher than the frequency of performing a process of detecting the first marker 10. FIG. 21 is a diagram illustrating a scene in which a state of the information processing apparatus 2000 switches between the first state and the second state.

First, when a content is not determined (for example, at the time of the information processing apparatus 2000 being activated), the information processing apparatus 2000 is in the first state. Thereafter, in a case where the first marker 10 is detected and the content is determined, the information processing apparatus 2000 transitions to the second state.

Various conditions may be adopted as a condition for transition from the second state to the first state. For example, the state of the information processing apparatus 2000 is switched to the first state in a case where a predetermined time has elapsed from transition to the second state. The predetermined time may be defined in common for all contents, or may be defined for each content. In another example, the state of the information processing apparatus 2000 is changed to the first state in response to the termination of the content (termination of the application or termination of the input operation using the input interface). In another example, in a case where the second marker 20 is not detected for a predetermined time or more in the second state, the state of the information processing apparatus 2000 is switched to the first state.

In another example, in a case where a part of the second marker 20 detected from the captured image 30 is lacked in the second state, the state of the information processing apparatus 2000 is switched to the first state. In this case, it is assumed that the second marker 20 is located on the periphery of the first marker 10. In a case where the second marker 20 is located on the periphery of the first marker 10, and the device 60 is operated (for example, a touch panel is operated) in order to change the first marker 10, a part of the second marker 20 is hidden by the user's hand and thus is not viewed.

Figure 22:
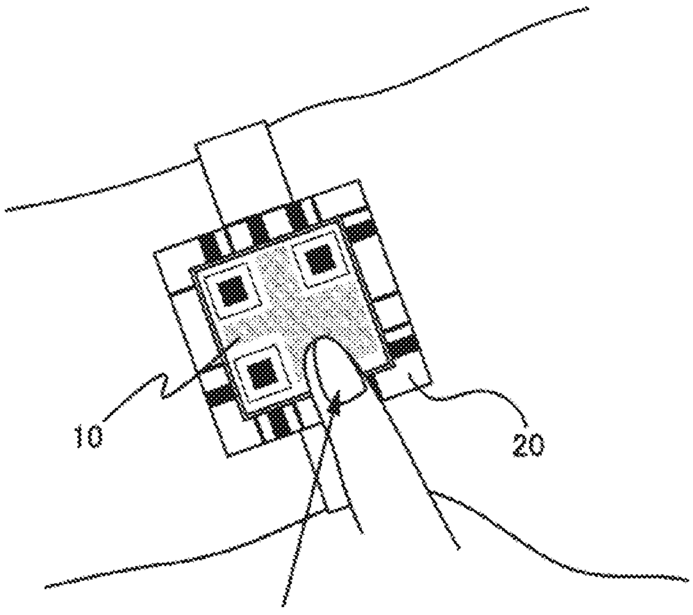
FIG. 22 is a diagram illustrating an operation of changing the first marker.

FIG. 22 is a diagram illustrating an operation of changing the first marker 10. In FIG. 22, the first marker 10 is an image displayed on the display screen 62. The second marker 20 is a mark printed on the bezel portion of the device 60. Since the user performs the operation of changing the first marker 10 by operating the touch panel of the device 60, a part of the second marker 20 is hidden by the user's finger. In other words, a part of the second marker 20 detected from the captured image 30 is lacked.

As mentioned above, a part of the second marker 20 detected from the captured image 30 being lacked indicates that there is a high probability of performing the operation of changing the first marker 10. Performing the operation of changing the first marker 10 indicates that the user is about to change contents. Therefore, the state of the information processing apparatus 2000 is switched to the first state under such a situation, and thus it is possible to increase a probability of detecting the first marker 10 when the user is about to change contents.

Note that, as described above, even though a part of the second marker 20 is lacked in the captured image 30, the second marker 20 can be detected as long as the second marker 20 is included in the captured image 30 to the extent where its similarity to the feature value of the second marker 20 prepared in advance is equal to or more than a predetermined threshold value.

In another example, in a case where the second marker 20 is not detected from the captured image 30 in the second state, the state of the information processing apparatus 2000 is switched to the first state. According to this method, when the user desires to change contents, the user can cause the information processing apparatus 2000 to transition to the first state that is suitable for the determination of the content, by performing an easy operation of make the second marker 20 not imaged (of excluding the second marker 20 from the view).

<Determination of Display Position of Content Image 40>

The second determination unit 2040 determines the display position of the content image 40 on the basis of the second marker 20. For example, in a case where a three-dimensional coordinate system is determined on the basis of the second marker 20, the position of the content image 40 is defined in advance as a position in the coordinate system.

Figure 23:
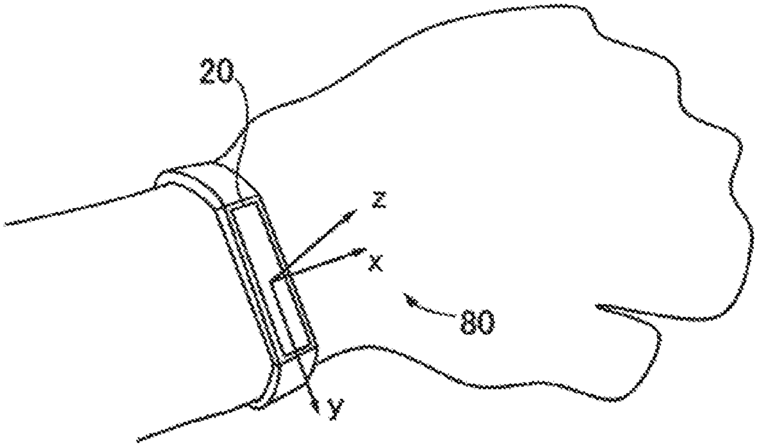
FIG. 23 is a diagram illustrating a coordinate system determined on the basis of the second marker.

FIG. 23 is a diagram illustrating a coordinate system 80 determined on the basis of the second marker 20. The coordinate system 80 is a three-dimensional coordinate system defined by the x direction, the y direction, and the z direction. Here, a well-known technique may be used as a technique of determining a three-dimensional coordinate system on the basis of a shape of a marker included in an image.

Figure 24:
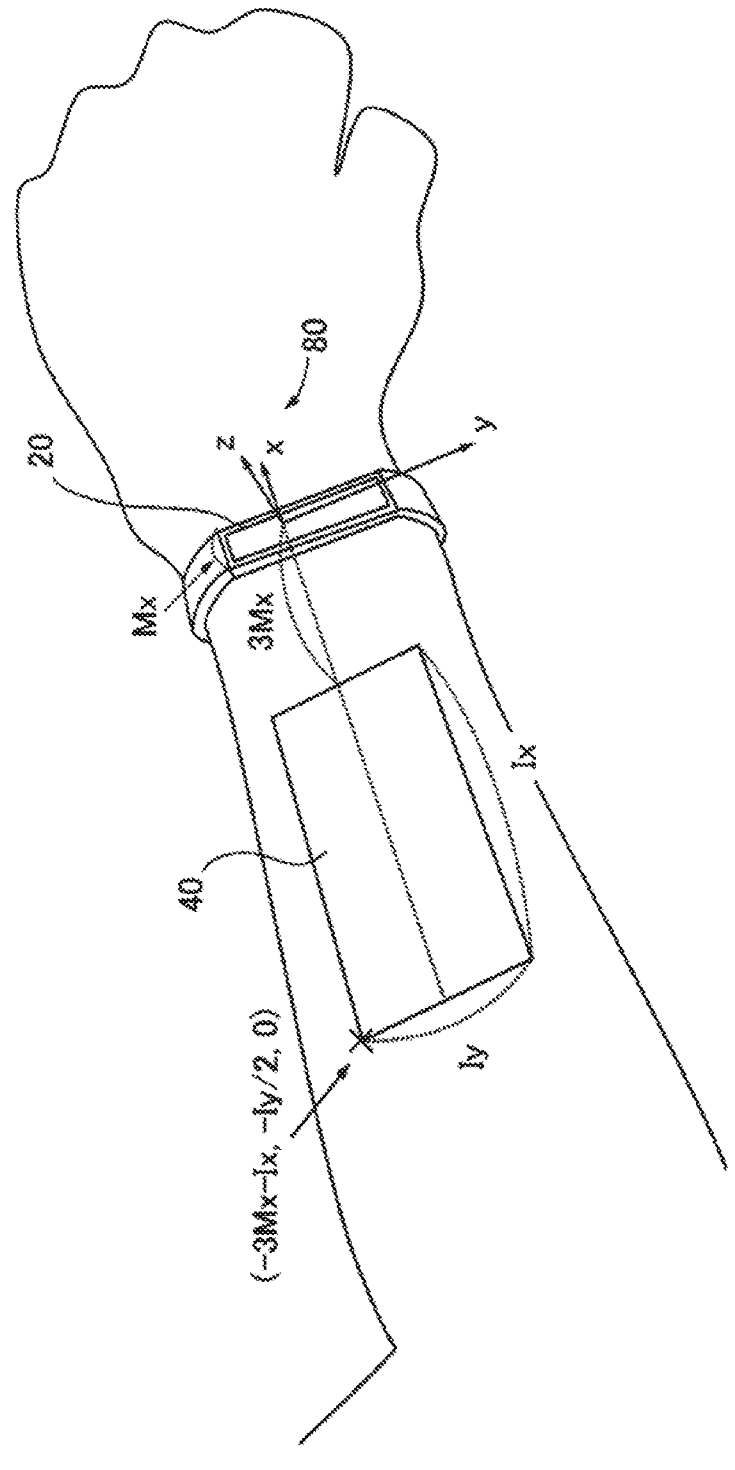
FIG. 24 is a diagram illustrating a position of a content image in the coordinate system.

FIG. 24 is a diagram illustrating the position of the content image 40 in the coordinate system 80. In the example illustrated in FIG. 24, the position of the content image 40 in the coordinate system 80 is defined in advance as $(-3Mx-Ix, -Iy/2, 0)$. Here, Mx represents a size of the second marker 20 in the x direction, Ix represents a size of the content image 40 in the x direction, and Iy represents a size of the content image 40 in the y direction. The position of the content image 40 represents the upper left coordinate of the content image 40. The display control unit 2060 displays the content image 40 on the display screen 50 such that the position in the coordinate system 80 becomes (−3Mx-Ix, −Iy/2, 0).

The position in a coordinate system defined on the basis of the second marker 20 may be defined in common for all contents, may be defined for each content, or may be defined for each content image 40.

<Pose or Size of Content Image 40>

The second determination unit 2040 may determine a pose or a size of the content image 40 on the basis of the second marker 20 in addition to the position of the content image 40. Hereinafter, a description will be made of each of methods of determining a pose and a size.

<<Method of Determining Pose of Content Image 40>>

The second determination unit 2040 determines the pose of the content image 40 according to the pose of the second marker 20. Specifically, first, the second determination unit 2040 determines the coordinate system 80 by using the second marker 20 captured in the captured image 30. The second determination unit 2040 determines the pose of the content image 40 on the basis of the determined coordinate system 80. For example, a predefined correspondence relationship between the coordinate system 80 and the pose of the content image 40 is used for the determination.

Figure 25:
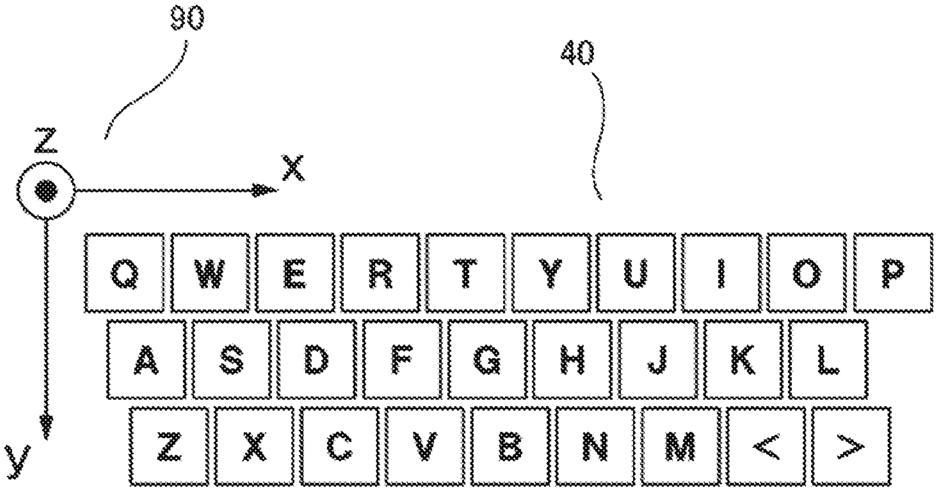
FIG. 25 is a diagram illustrating a correspondence relationship between the coordinate system and a pose of the content image.

FIG. 25 is a diagram illustrating a correspondence relationship between the coordinate system 80 and a pose 90 of the content image 40. In FIG. 25, in the pose 90 of the content image 40, a rightward direction of when the content image 40 is seen in a plan view is the x direction in the coordinate system 80, a downward direction of when the content image 40 is seen in a plan view is the y direction in the coordinate system 80, and a direction opposite to a visual line direction of when the content image 40 is seen in a plan view is the z direction in the coordinate system 80. The correspondence relationship may be set in advance in the second determination unit 2040, or may be stored in a storage device which can be accessed from the second determination unit 2040. The correspondence relationship may be defined in common for all content images 40, may be defined for each content, or may be defined for each content image 40.

The second determination unit 2040 may not determine the pose of the content image 40 by using the second marker 20. In this case, for example, the second determination unit 2040 displays the content image 40 in a fixed pose regardless of the second marker 20.

<<Determination of Size of Operation Content Image>>

The second determination unit 2040 determines the size of the content image 40 to be displayed on the display screen 50 according to the size of the second marker 20 included in the captured image 30. For example, a ratio of the size of the second marker 20 and the size of the content image 40 is defined in advance. The second determination unit 2040 determines the size of the content image 40 to be displayed on the display screen 50 on the basis of the ratio and the size of the second marker 20 captured in the captured image 30. The ratio may be set in advance in the second determination unit 2040, or may be stored in a storage device which can be accessed from the second determination unit 2040. The ratio may be defined in common for all content images 40, may be defined for each content, or may be defined for each content image 40.

The second determination unit 2040 may not determine the size of the content image 40 by using the second marker 20. In this case, for example, the second determination unit 2040 displays the content image 40 at a fixed size regardless of the size of the second marker 20.

<Display of Content Image 40>

The display control unit 2060 displays the content image 40 on the display screen 50. Here, a well-known technique may be used as a technique of displaying an image on the display screen 50.

Note that, in a case where the second marker 20 is not included in the captured image 30, the display control unit 2060 may not display the content image 40 on the display screen 50, or may display the content image 40 on the display screen 50 in a predetermined form (a predetermined position, a predetermined pose, and a predetermined size). In the latter case, for example, the display control unit 2060 sets a central position of the content image 40 as a central position of the display screen 50, set a direction of seeing the content image 40 in a plan view as a direction of seeing the display screen 50 in a plan view, and displays the content image 40 at the maximum size which is displayable on the display screen 50.

FIG. 26 are diagrams illustrating a scene in which a form of the content image 40 displayed on the display screen 50 is changed in cases where the second marker 20 is included in the captured image 30 and is not included therein. In this example, the information processing apparatus 2000 is realized by using the transmissive head mounted display 100. A dotted frame (range 120) represents a range viewed by the user through the transmissive display screen 50. The range 120 also represents an imaging range of the camera 130. In other words, things other than the content image 40 included in the range 120 are also included in the captured image 30.

Figure 26A:
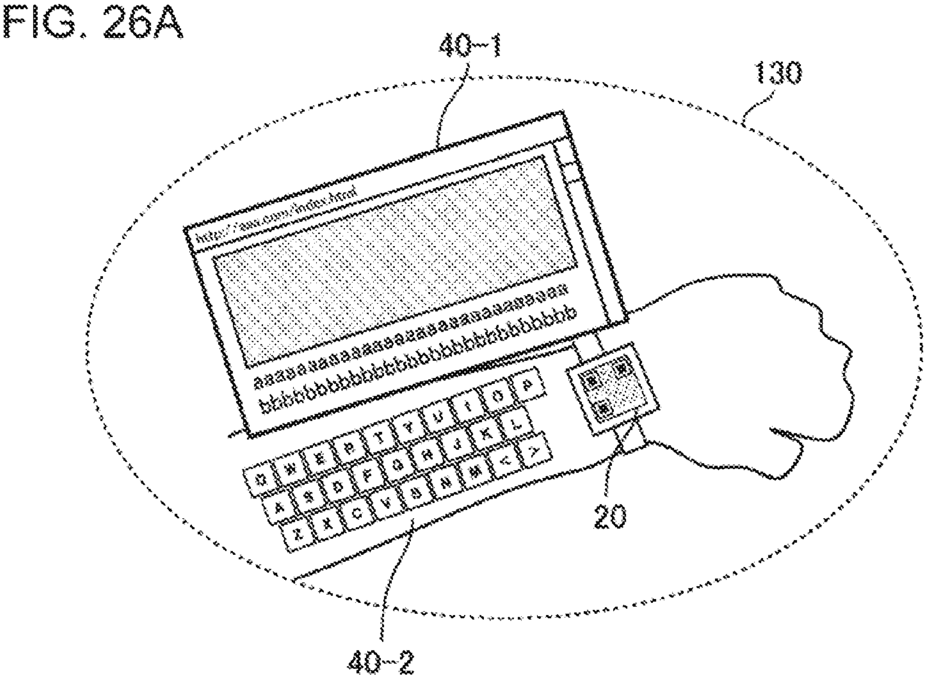
FIG. 26 are diagrams illustrating a scene in which an aspect of the content image displayed on a display screen is changed in cases where the second marker is included in a captured image and is not included therein.

In FIG. 26A, since the second marker 20 is included in the imaging range of the camera 130, the second marker 20 is detected from the captured image 30. Therefore, a content image 40-1 representing a window of a web browser and a content image 40-2 representing a keyboard for performing input on the web browser are displayed at a position, at a size, and in a pose defined by the second marker 20.

Figure 26B:
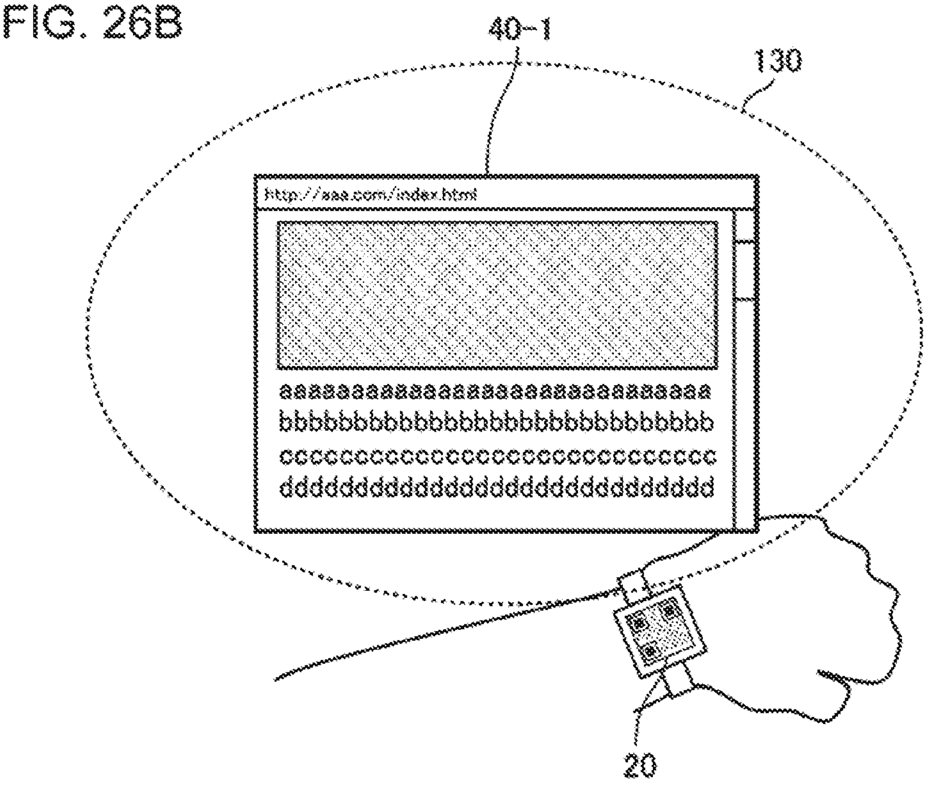

On the other hand, in FIG. 26B, since second marker 20 is not included in the imaging range of the camera 130, the second marker 20 is not detected from the captured image 30. Therefore, the content image 40-1 is displayed large, and the content image 40-2 is not displayed.

As mentioned above, according to the method of switching display in a case where the second marker 20 is included in the captured image 30 and a case where the second marker 20 is not included therein, between the case of the user desires to perform an input operation and the case of the user desires to focus on viewing of information, the user can easily perform switching of the displays appropriate for respective cases, for example. For example, in the example illustrated in FIG. 26, when the user desires to focus on viewing of information, the window of the web browser can be easily made large by excluding the second marker 20 from the user's view. On the other hand, when the user desires to input characters, an input interface can be easily displayed by placing the second marker 20 in the user's view. As mentioned above, the convenience of the information processing apparatus 2000 is improved.

<Detection of Input Operation Using Marker>

The information processing apparatus 2000 may detect the user's input operation by using the first marker 10 or the second marker 20. Hereinafter, a description will be made of a method of detecting the user's input operation by using the first marker 10. In the method described below, the second marker 20 may be used instead of the first marker 10.

Herein, the first marker 10 is also used to determine a timing at which the user performs an input operation in addition to the determination of a content. In this case, the first marker 10 is realized by an image displayed on the display screen 62 of the device 60. A sensor 64 is attached to the user's body. Any sensor whose sensing result can change in response to the user's input operation may be used as the sensor 64. For example, the sensor 64 is a vibration sensor, an acceleration sensor, a vibration switch, a pressure sensor, or an electrostatic capacitance sensor.

The device 60 acquires a sensing result in the sensor 64. To do so, the sensor 64 is connected to the device 60. For example, the sensor 64 is provided inside the device 60. However, the sensor 64 may be connected to the device 60 in any aspect in which the device 60 can be notified of the sensing result, and is not necessarily required to be provided inside the device 60. For example, the sensor 64 may be directly attached to the user's body, or may be attached to the user's clothes.

The user performs an input operation in such a manner where a sensing result in the sensor 64 is affected. For example, in a case where the sensor 64 is a vibration sensor, the user performs an input operation so as to apply vibration to the sensor 64 at a timing of starting or finishing the input operation. In another example, in a case where the sensor 64 is a vibration sensor built into the device 60, the user taps the arm so as to apply vibration to the sensor 64 at a timing of starting or finishing the input operation.

The device 60 changes the first marker 10 displayed on the display screen 62 according to a sensing result in the sensor 64. For example, in a case where the sensor 64 is a vibration sensor, the device 60 changes the first marker 10 in response to the detection of vibration of a predetermined magnitude or more in the sensor 64.

Figure 27:
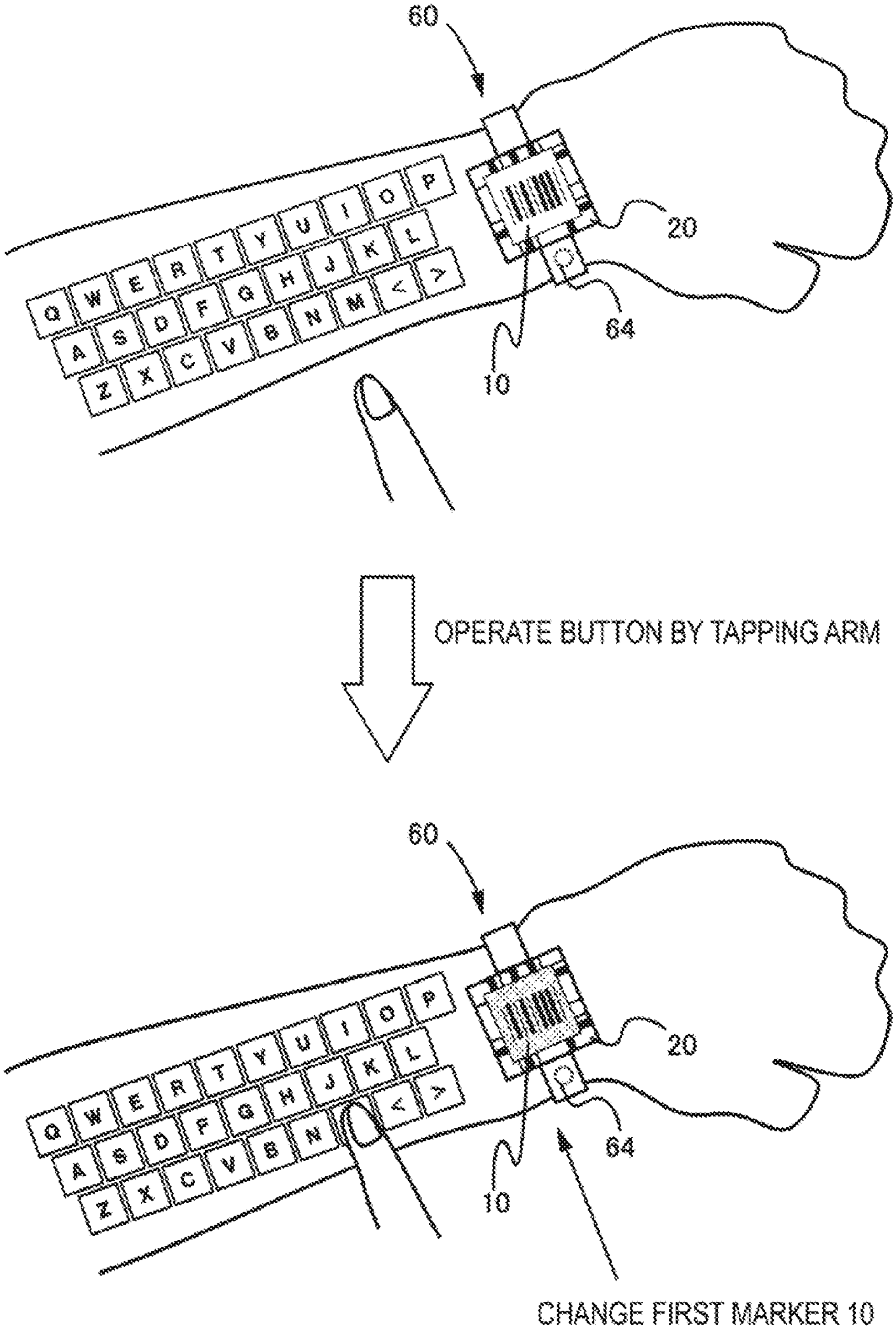
FIG. 27 is a diagram illustrating a scene in which the first marker is changed due to an input operation performed by a user.

The information processing apparatus 2000 detects that the first marker 10 displayed on the display screen 62 has been changed by analyzing a plurality of repeatedly generated captured images 30. Consequently, the information processing apparatus 2000 determines a timing of the input operation performed by the user. FIG. 27 is a diagram illustrating a scene in which the first marker 10 is changed due to an input operation performed by the user.

Here, it is necessary for the second determination unit 2040 of the present example embodiment to determine the same content in both of the case where the first marker 10 before being changed is used and the case where the first marker 10 after being changed is used. This may be realized in various methods. For example, the device 60 associates a plurality of different first markers 10 with the same content. Then, when changing the first marker 10 according to a sensing result in the sensor 64, the device 60 displays on the display screen 62 another first marker 10 associated with the same content as the content determined on the basis of the first marker 10 before being changed.

In another example, the device 60 changes the first marker 10 to the extent where the determination of the first marker 10 in the second determination unit 2040 is not affected. For example, it is assumed that the second determination unit 2040 determines the first marker 10 on the basis of a pattern or a shape of the first marker 10. Specifically, a content is associated with a pattern or a shape. In this case, the device 60 changes, for example, only a color of the display screen 62 without changing a pattern or a shape displayed on the display screen 62. For example, in the example illustrated in FIG. 27, the first marker 10 before being changed and the first marker 10 after being changed are identical in their barcode portion, and are different in a background color. In this case, by determining a content based on the shape of the barcode portion regardless of its background color, the first marker 10 can be changed to the extent not affecting the determination of a content in the first determination unit 2020.

As described above, as the sensor 64, not only a vibration sensor but also various sensors may be used. For example, in a case where the sensor 64 is an acceleration sensor, the device 60 changes the first marker 10 displayed on the display screen 62 when the sensor 64 measures acceleration of a predetermined magnitude or more. For example, in a case where the sensor 64 is a pressure sensor, the device 60 changes the first marker 10 displayed on the display screen 62 when the sensor 64 measures pressure of a predetermined magnitude or more. In another example, in a case where the sensor 64 is an electrostatic capacitance sensor, the device 60 changes the first marker 10 displayed on the display screen 62 when the sensor 64 measures displacement of an electrostatic capacitor of a predetermined magnitude or more. A case where the sensor 64 is a vibration switch is the same as the case where the sensor 64 is a vibration sensor.

As described above, there are various input operations which are recognizable by using the first marker 10. For example, it is assumed that an input operation performed by the user is an operation on an input interface (a keyboard or buttons) displayed as the content image 40. In this case, the information processing apparatus 2000 detects an object (hereinafter, an operation body) used for an input operation from the captured image 30 which is generated at a timing at which the first marker 10 is changed or a timing close thereto (a timing corresponding to a predetermined time before or after the timing at which the first marker 10 is changed). The operation body is, for example, the user's finger, or a predetermined object such as a pen held in the user's hand. The information processing apparatus 2000 recognizes the user's input operation on the basis of a position of the detected operation body in the captured image 30 and a position of the content image 40 displayed on the display screen 50. For example, in a case where the input interface is a keyboard, the information processing apparatus 2000 determines which key the user has operated on the basis of a position of the detected operation body and a position of the keyboard on the display screen 50.

The user's input operation is not limited to an operation on an input interface displayed as the content image 40. For example, the user may perform an operation of drawing a character or a graphic with the operation body. In other words, motion of the operation body is recorded as a content of the input operation. In this case, for example, the user performs an input operation such that the first marker 10 is changed at each of timings of starting and finishing the input operation. For example, the user taps the arm attached with the device 60, then draws a graphic, and finally taps the arm again. Consequently, the first marker 10 is changed at each of timings of starting and finishing the input operation. The information processing apparatus 2000 determines timings of starting and finishing an input operation by detecting a change of the first marker 10. The information processing apparatus 2000 analyzes a plurality of captured images 30 generated between the starting timing and the finishing timing of the input operation so as to detect motion of the operation body during that time, and recognizes the motion as the input operation.

In the above-described example, in a case where an input operation is performed by using motion of the operation body, the user performs input operations such that the first marker 10 is changed twice. However, the number of times of changing the first marker 10 may be once. In this case, for example, the user performs an operation (for example, tapping the arm) of affecting a sensing result in the sensor 64 at a timing of starting an input operation. The information processing apparatus 2000 recognizes an input operation, for example, with a timing at which the first marker 10 is changed as a starting time point of the input operation and with a timing corresponding to a predetermined timing after the time point as a finishing time point of the input operation. Similarly, the user may perform an operation of affecting a sensing result in the sensor 64 at a finishing timing of an input operation. In this case, the information processing apparatus 2000 recognizes an input operation, for example, with a timing at which the first marker 10 is changed as a finishing time point of the input operation and with a timing corresponding to a predetermined timing before the time point as a starting time point of the input operation.

Figure 28:
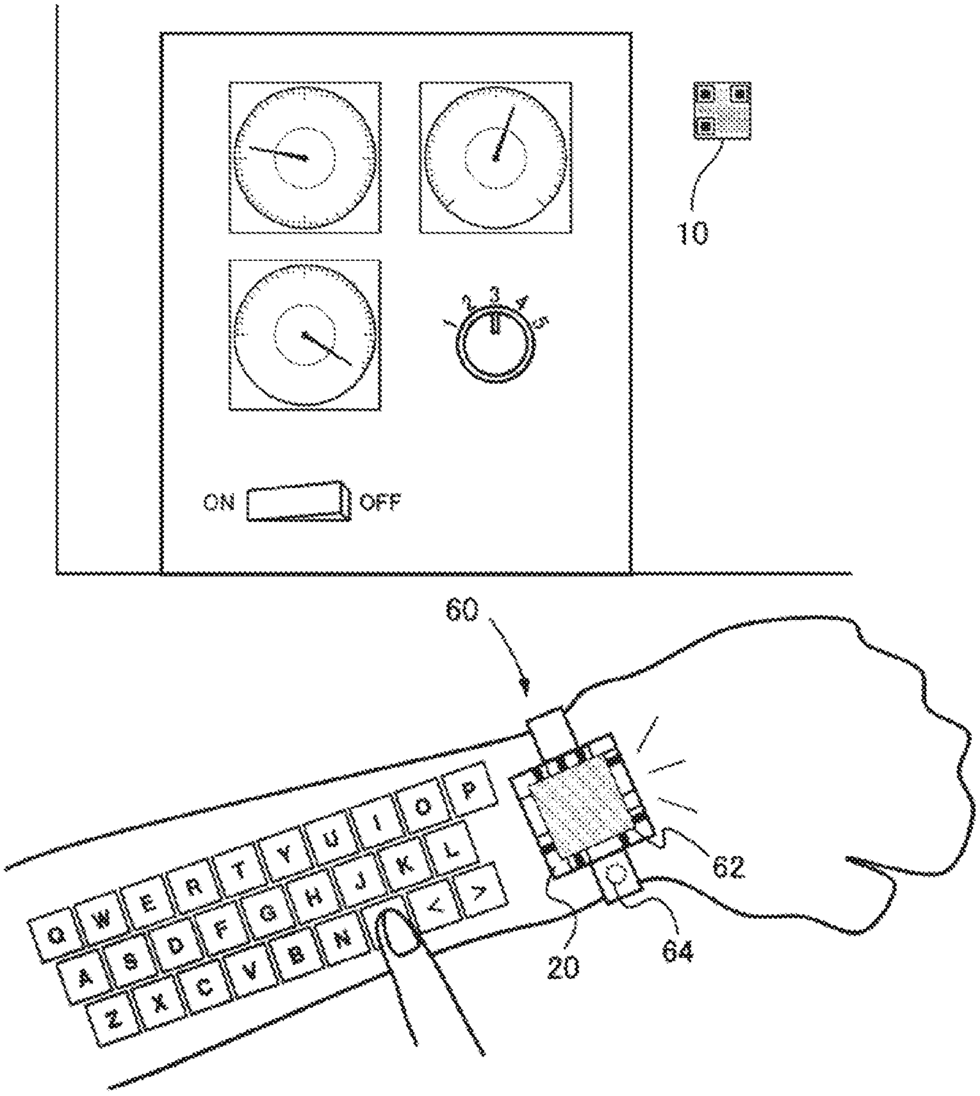
FIG. 28 is a diagram illustrating a first example of a method of determining an input operation timing without changing the first marker or the second marker.

Here, in the method of determining an input operation timing by using the sensor 64, the first marker 10 or the second marker 20 is not necessarily required to be changed as described above, and others than the first marker 10 or the second marker 20 may be changed. FIG. 28 is a diagram illustrating a first example of a method of determining an input operation timing without changing the first marker 10 or the second marker 20. In FIG. 28, the first marker 10 is provided in advance in a place where the information processing apparatus 2000 is used. The second marker 20 is provided on the bezel portion of the device 60.

The device 60 changes the display screen 62 according to a sensing result in the sensor 64 (for example, according to vibration of a predetermined magnitude or more is measured). Specifically, the device 60 changes a color of the backlight of the display screen 62 or causes the backlight to blink. The information processing apparatus 2000 determines a timing of an input operation performed by the user by measuring the change of the display screen 62 by using the captured image 30.

Figure 29:
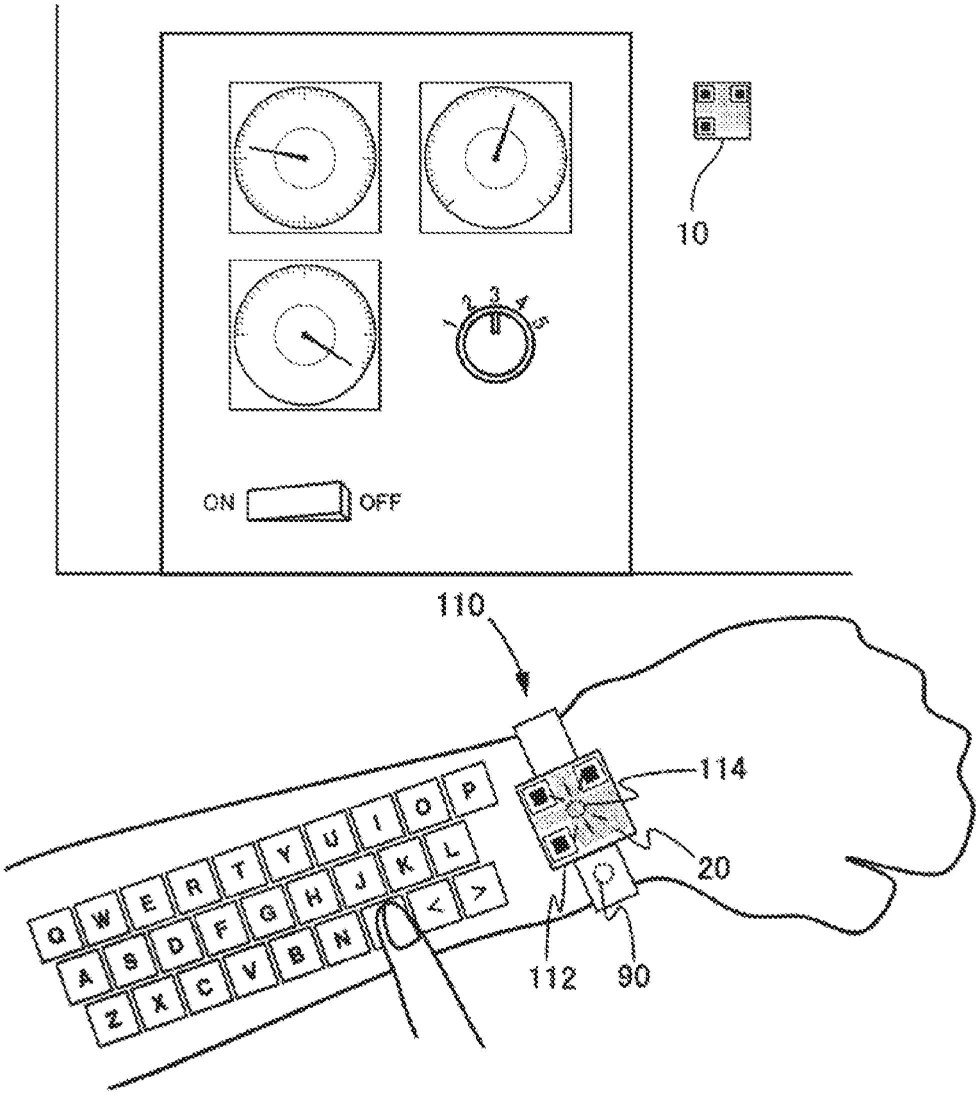
FIG. 29 is a diagram illustrating a second example of a method of determining an input operation timing without changing the first marker or the second marker.

FIG. 29 is a diagram illustrating a second example of a method of determining an input operation timing without changing the first marker 10 or the second marker 20. The first marker 10 in FIG. 29 is the same as the first marker 10 in FIG. 28. On the other hand, the second marker 20 in FIG. 29 is provided on the plate-shaped object 112 of the attachment 110. The plate-shaped object 112 is made of a translucent resin, and an LED light 114 is provided under the plate-shaped object 112. The LED light 114 is configured to blink according to a sensing result in the sensor 64. As described above, since the plate-shaped object 112 is translucent, a scene in which the LED light 114 blinks can be detected from the captured image 30. Therefore, the information processing apparatus 2000 determines an input operation timing by detecting blinking of the LED light 114 by using the captured image 30.

<Use Cases of Information Processing Apparatus 2000>

Herein, use cases of the information processing apparatus 2000 will be exemplified. Note that use cases described below are only examples, and a method of using the information processing apparatus 2000 is not limited to the use cases described below. In the following example, it is assumed that the information processing apparatus 2000 is realized by using the head mounted display 100. In other words, the display screen 50 on which the content image 40 is displayed is provided in the lens portion of the head mounted display 100. The camera 130 generating the captured image 30 is provided near the lens of the head mounted display 100.

<<First Use Case: Support of Facility Checking Task>>

The information processing apparatus 2000 may be used to support a task of checking facilities (for example, equipment) in a factory. In this case, a user causes the camera 130 to image the first marker 10 corresponding to an application (hereinafter, a checking support application) realizing support of the checking task, and thus executes the application.

A scene in which the checking support application is executed is illustrated in, for example, FIG. 3. For example, the checking support application acquires a check list registered in a database. The check list shows information (a check location or check contents) regarding each of a plurality of check items. With respect to each check item included in the check list, the display control unit 2060 sequentially displays the content image 40-1 representing the check item on the display screen 50. The display control unit 2060 displays the content image 40-2 representing an input interface associated with the check item on the display screen 50. The user operates the input interface so as to input a check result.

<<Second Use Case: Support of Picking Task>>

The information processing apparatus 2000 may be used to support picking task in a warehouse or the like. Here, the picking task indicates a task of finding and collecting desired objects from among objects placed on shelves. A user causes the camera 130 to image the first marker 10 corresponding to an application (hereinafter, a picking support application) realizing support of the picking task, and thus executes the application.

The picking support application acquires, for example, a list of objects to be collected from a database. The picking support application sequentially generates, as the content image 40, a guide indicating a location where a product is stored in the warehouse with respect to each product shown in the list. The display control unit 2060 displays the content image 40 on the display screen 50. In the above-described way, the user can easily move to a location where objects to be collected are stored.

Figure 30:
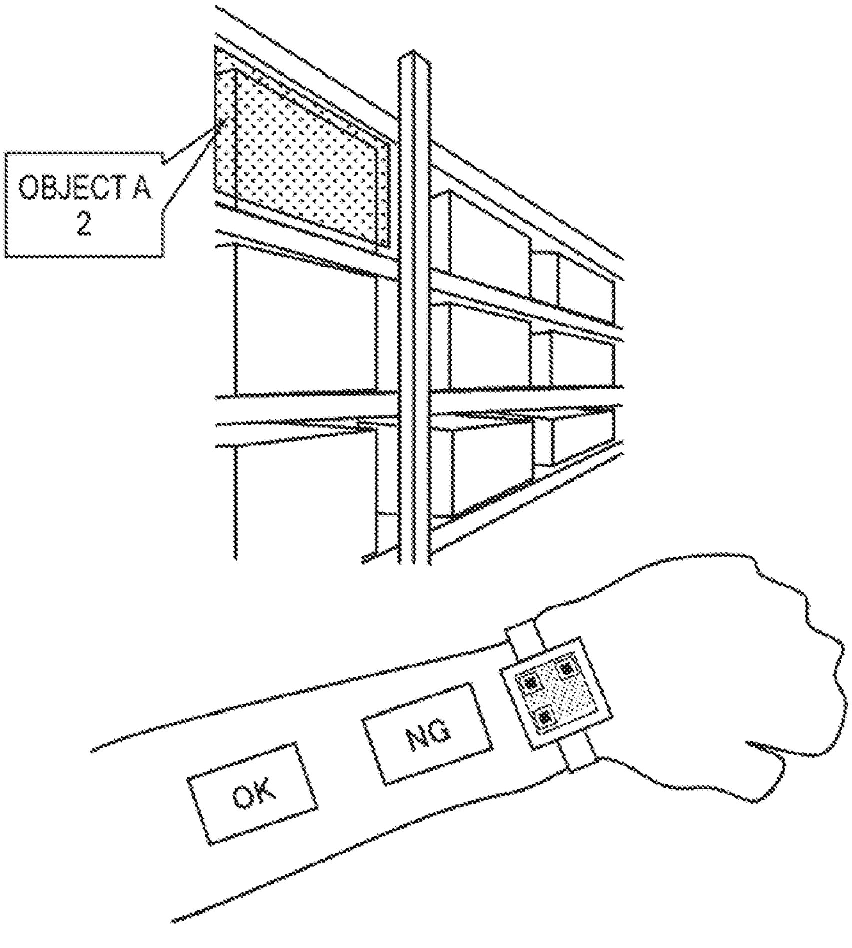
FIG. 30 is a diagram illustrating a scene in which a place of objects to be collected is displayed in an emphasize manner.

In a case where a location where objects to be collected are placed is included in the imaging range of the camera 130, the picking support application generates the content image 40 for displaying the location in an emphasized manner. The display control unit 2060 displays the content image 40 on the display screen 50. FIG. 30 is a diagram illustrating a scene in which a location of objects to be collected is displayed in an emphasized manner.

The picking support application displays the content image 40 representing an input interface for inputting a record regarding the picking task on the display screen 50. The user inputs a task record by using the input interface.

<<Third Use Case: Support of Task in Medical Site>>

The information processing apparatus 2000 may be used to support various tasks a medical site. For example, in a case where a nurse gives an intravenous drip injection, a task called three-point collation or the like is performed. This task is performed in giving an intravenous drip injection in order to determine whether or not the task is accurately performed by collating a combination of three items: 1) a nurse who is performing the task, 2) a patient to which the intravenous drip injection is given, and 3) administered medicine.

Figure 31:
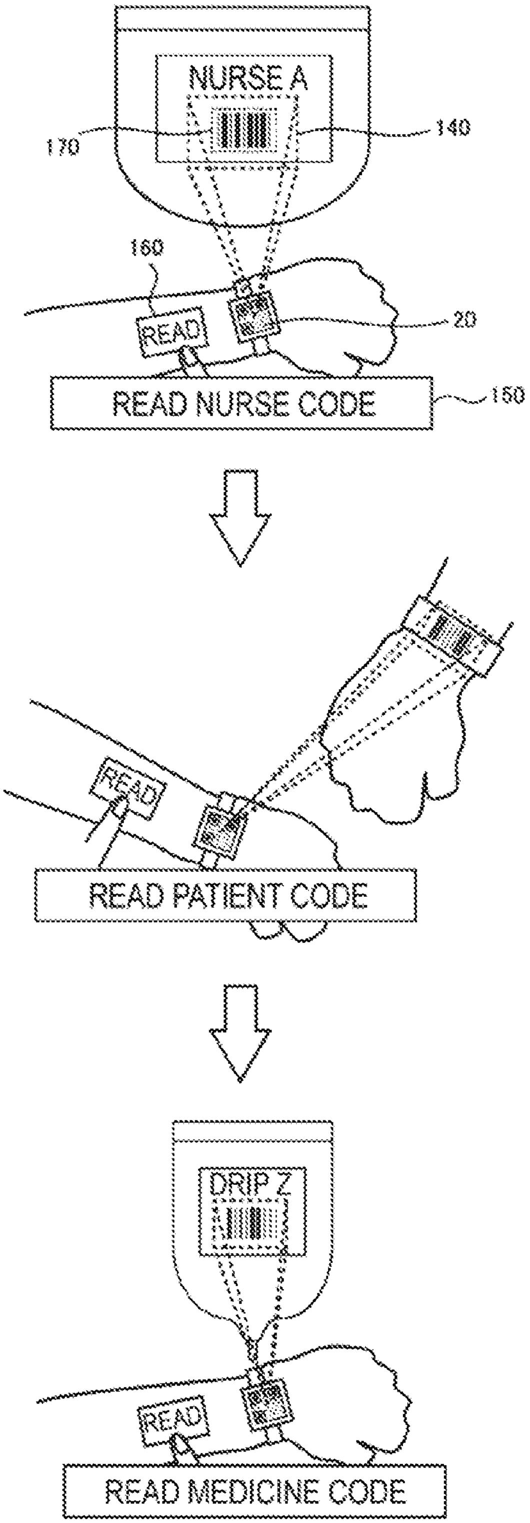
FIG. 31 is a diagram illustrating a scene in which three-point collation is performed by using the information processing apparatus.

Therefore, the information processing apparatus 2000 realizes support of the three-point collation. FIG. 31 is a diagram illustrating a scene in which three-point collation is performed by using the information processing apparatus 2000. A user causes the camera 130 to image the first marker 10 corresponding to an application realizing support of the three-point collation, and thus executes the application. The application provides a function for reading an identifier of each of the above 1) to 3). First, the display control unit 2060 displays the content image 40 (frame line 140) representing a range in which a nurse code 170, with which the nurse is identified, is read. The content image 40 (message 150) representing a message for sending a notification that the nurse code 170 has to be read is displayed. An input interface (button 160) for instructing the application to read the nurse code is displayed.

A display position of each content image 40 is determined on the basis of a position of the second marker 20. Therefore, the user changes a position of the second marker 20 by moving the arm thereof such that the nurse code 170 enters the frame line 140. The user presses the button 160 (for example, the user places the finger at a position overlapping the button 160), and thus causes the application to read the nurse code 170. The user performs a similar operation for reading of an identifier of the patient and reading of an identifier of the medicine. The three-point collation is realized through the above-described operations.

Note that there are various methods of using the information processing apparatus 2000 in addition to support of three-point collation. For example, since a nurse performs a task (blood collecting or an intravenous drip injection) provided from a doctor, a notification provided to the nurse from the doctor are displayed by using the information processing apparatus 2000.

As mentioned above, the example embodiments of the present invention have been described with reference to the drawings, but these are only examples of the present invention, and combinations of the example embodiments and various configurations other than the example embodiments may be employed.

What is claimed is:

1. An information processing apparatus comprising:

a processor; and a memory storing instructions executable by the processor to:

detect a first marker from a captured image, and determines a content corresponding to the detected first marker;

detect a second marker which is different from the first marker from a captured image, and determines a display position in a first display screen on the basis of the detected second marker; and display a content image regarding the determined content at the determined display position in the first display screen, wherein the processor detects the first marker which is an image displayed on a second display screen provided in an attachment attached to a user's body, and the first marker displayed on the second display screen is changed according to an operation on the attachment.

2. The information processing apparatus according to claim 1, wherein the second marker is provided on the periphery of the first marker.

3. The information processing apparatus according to claim 1, wherein the first marker and the second marker are provided on an attachment attached to a user's body, and wherein a position of the first marker and a position of the second marker are different from each other in a direction perpendicular to a plane of the first marker.

4. The information processing apparatus according to claim 1, wherein the processor detects the second marker printed or drawn on an attachment attached to a user's body, or the second marker formed in a shape of the attachment.

5. The information processing apparatus according to claim 1, wherein the processor changes the display position of the content image according to a change of a position of the first marker detected from the captured image.

6. The information processing apparatus according to claim 1, wherein the first display screen is provided in a head mounted display.

7. An information processing system comprising:

a first marker;

a second marker that is different from the first marker;

a first display screen; and an information processing apparatus, wherein the information processing apparatus includes:

a processor; and a memory storing instructions executable by the processor to:

detect the first marker from a captured image, and determines a content corresponding to the detected first marker;

detect the second marker from a captured image, and determines a display position in the first display screen on the basis of the detected second marker; and display a content image regarding the determined content at the determined display position in the first display screen, wherein the processor detects the first marker which is an image displayed on a second display screen provided in an attachment attached to a user's body, and the first marker displayed on the second display screen is changed according to an operation on the attachment.

8. The information processing system according to claim 7, wherein the second marker is provided on the periphery of the first marker.

9. The information processing system according to claim 7, wherein the first marker and the second marker are provided on an attachment attached to a user's body, and wherein a position of the first marker and a position of the second marker are different from each other in a direction perpendicular to a plane of the first marker.

10. The information processing system according to claim 7, wherein the second marker is printed or drawn on an attachment attached to a user's body, or is formed in a shape of the attachment.

11. The information processing system according to claim 7, wherein the processor changes the display position of the content image according to a change of a position of the first marker detected from the captured image.

12. The information processing system according to claim 7, wherein the first display screen is provided in a head mounted display.

13. A control method executed by a computer, comprising:

detecting a first marker from a captured image, and determining a content corresponding to the detected first marker;

detecting a second marker which is different from the first marker from a captured image, and determining a display position in a first display screen on the basis of the detected second marker;

displaying a content image regarding the determined content at the determined display position in the first display screen;

detecting the first marker which is an image displayed on a second display screen provided in an attachment attached to a user's body, wherein the first marker displayed on the second display screen is changed according to an operation on the attachment.

14. The control method according to claim 13, wherein the second marker is provided on the periphery of the first marker.

15. The control method according to claim 13, wherein the first marker and the second marker are provided on an attachment attached to a user's body, and wherein a position of the first marker and a position of the second marker are different from each other in a direction perpendicular to a plane of the first marker.

16. The control method according to claim 13, further comprising:

detecting the second marker printed or drawn on an attachment attached to a user's body, or the second marker formed in a shape of the attachment.

17. The control method according to claim 13, further comprising:

changing the display position of the content image according to a change of a position of the first marker detected from the captured image.

18. The control method according to claim 13, wherein the first display screen is provided in a head mounted display.

19. A non-transitory computer-readable storage medium storing a program causing a computer to execute each step of the control method according to claim 13.

* * * * *